(12) United States Patent
Komura et al.

(10) Patent No.: US 8,116,034 B2
(45) Date of Patent: Feb. 14, 2012

(54) THERMALLY ASSISTED MAGNETIC HEAD HAVING MAIN POLE ARRANGED BETWEEN NEAR-FIELD LIGHT-GENERATING PORTIONS AND MANUFACTURING METHOD OF SAME

(75) Inventors: Eiji Komura, Tokyo (JP); Koji Shimazawa, Tokyo (JP); Kosuke Tanaka, Tokyo (JP); Seiichi Takayama, Tokyo (JP); Hitoshi Hatate, Tokyo (JP)

(73) Assignee: TDK Corporation, Tokyo (JP)

( * ) Notice: Subject to any disclaimer, the term of this patent is extended or adjusted under 35 U.S.C. 154(b) by 735 days.

(21) Appl. No.: 12/204,452

(22) Filed: Sep. 4, 2008

(65) Prior Publication Data

US 2009/0168220 A1 Jul. 2, 2009

(30) Foreign Application Priority Data

Dec. 28, 2007 (JP) .................................. 2007-341103

(51) Int. Cl.
    *G11B 5/02* (2006.01)
    *G11B 5/127* (2006.01)
(52) U.S. Cl. ............... 360/125.31; 360/59; 360/125.74
(58) Field of Classification Search ........... 360/125.31, 360/125.74, 59; 385/129, 132, 14; 359/325
See application file for complete search history.

(56) References Cited

U.S. PATENT DOCUMENTS 7,266,268 B2 * 9/2007 Challener et al. ............... 385/37
7,649,677 B2 * 1/2010 Jin et al. ........................ 359/325

FOREIGN PATENT DOCUMENTS

| | | |
|---|---|---|
| JP | A 10-162444 | 6/1998 |
| JP | A 2001-255254 | 9/2001 |
| JP | A 2003-114184 | 4/2003 |
| JP | A-2003-272103 | 9/2003 |
| JP | A 2004-158067 | 6/2004 |
| JP | A 2005-4901 | 1/2005 |
| JP | A 2005-190655 | 7/2005 |
| JP | A 2006-185548 | 7/2006 |
| WO | WO 2007/074650 A1 | 7/2007 |

OTHER PUBLICATIONS

Miyanishi et al., "Near-Field Assisted Magnetic Recording," *IEEE Transactions on Magnetics*, vol. 41, No. 10, Oct. 2005, pp. 2817-2821.
Thiele et al., "Magnetic and Structural Properties of FePt-FeRh Exchange Spring Films for Thermally Assisted Magnetic Recording Media," *IEEE Transactions on Magnetics*, vol. 40, No. 4, Jul. 2004, pp. 2537-2542.
Challener, et al., "Heat-Assisted Magnetic Recording by a Near-Field Transducer with Efficient Optical Energy Transfer", Nature Photonics, vol. 3, Apr. 2009, pp. 220-224.

* cited by examiner

*Primary Examiner* — Allen Heinz
(74) *Attorney, Agent, or Firm* — Oliff & Berridge, PLC

(57) ABSTRACT

When first and second near-field light-generating portions are irradiated with laser light or other energy rays, near-field light is generated at the tips of both the near-field light-generating portions. By means of the near-field light thus generated, a magnetic recording medium opposing the medium-opposing surface is heated, and the coercivity of the magnetic recording medium is lowered. Since at least a portion of the main magnetic pole is positioned within the spot region including the region between the first and second near-field light-generating portions, the tips of both the near-field light-generating portions and the main magnetic pole can be brought extremely close together, and high-density recording can be performed.

5 Claims, 17 Drawing Sheets

THERMALLY ASSISTED MAGNETIC HEAD HAVING MAIN POLE ARRANGED BETWEEN NEAR-FIELD LIGHT-GENERATING PORTIONS AND MANUFACTURING METHOD OF SAME

BACKGROUND OF THE INVENTION

1. Field of the Invention

This invention relates to a thermally assisted magnetic head capable of high-density recording, and to a manufacturing method for such a head.

2. Related Background Art

The rising recording densities of hard disk devices have led to demands for further improved performance of thin film magnetic heads. As thin film magnetic heads, composite thin film magnetic heads, having a structure in which a magnetoresistance (MR) effect element or other magnetic detection element is laminated with an electromagnetic coil element or other magnetic recording element, are widely used; by means of these elements, data signals can be read from and written to the magnetic disks that are the magnetic recording media.

In general, magnetic recording media are discontinuous media resulting from aggregation of so-called fine magnetic particles, which each of the fine magnetic particles having a single-domain structure. Here, one recording bit comprises a plurality of fine magnetic particles. Hence in order to raise the recording density, the fine magnetic particles must be made smaller, and the irregularities at the boundaries between recording bits must be made smaller. However, if the fine magnetic particles are made too small, a decline in thermal stability of magnetization, accompanying the smaller particle volume, becomes a problem.

An index of the thermal stability of magnetization is given by the quantity $K_U V/k_B T$. Here $K_U$ is the magnetic anisotropy energy of the fine magnetic particles, V is the volume of one fine magnetic particle, $k_B$ is the Boltzmann constant, and T is the absolute temperature. Making the fine magnetic particles smaller mean precisely that V is made small, and without further changes, as $K_U V/k_B T$ grows smaller, thermal stability is lost. In order to address this problem, simultaneously making $K_U$ larger is conceivable; however, this increase in $K_U$ would cause an increase in the coercivity of the recording media. On the other hand, the write magnetic field intensity of the magnetic head is substantially determined by the saturation magnetic flux density of the soft magnetic material comprised by the magnetic pole within the head. Hence if the coercivity exceeds a tolerance value determined by the limit of this write magnetic field intensity, writing is no longer possible.

As methods to resolve such problems with the thermal stability of magnetization, so-called thermally assisted magnetic recording methods have been proposed, in which, while using magnetic material with a large $K_U$, heat is applied to the recording media immediately before applying the write magnetic field, in order to lower the coercivity and perform writing. Such methods can be broadly divided into magnetic-dominant recording methods and light-dominant recording methods. In magnetic-dominant recording methods, the main component of writing is an electromagnetic coil element, and the light irradiation diameter is large compared with the track width (recording width). On the other hand, in light-dominant recording methods, the main component of writing is a light irradiation portion, and the light irradiation diameter is substantially the same as the track width (recording width). That is, whereas in magnetic-dominant recording methods the spatial resolution is determined by the magnetic field, in light-dominant recording methods the spatial resolution is determined by the light.

Japanese Patent Laid-open No. H10-162444 discloses technology to record ultra-fine magnetic domain signals onto a magneto-optical disc with an ultra-fine light beam spot, utilizing a magnetic head employing a solid emulsion lens. Also in S. Miyanishi et al, "Near-field assisted magnetic recording", IEEE Transactions on Magnetics, 2005, Vol. 41, pp. 2817-2821, technology is disclosed in which a U-shape near-field probe formed on a quartz slider is employed to generate evanescent light and a magnetic field, to form a recording pattern of approximately 70 nm.

Japanese Patent Laid-open No. 2001-255254, Japanese Patent Laid-open No. 2003-114184, and Japanese Patent Laid-open No. 2006-185548 disclose a thermally assisted magnetic head in which a conductive plate-type near-field light generation portion is positioned on a medium-opposing surface, and by irradiating with light from the side opposite the medium side, near-field light is generated. A pointed tip portion is formed at one end of the near-field light generation portion, and the near-field light is mainly irradiated from this tip portion.

Japanese Patent Laid-open No. 2004-158067 discloses technology in which a scattering body comprising a near-field probe is formed in contact with the main magnetic pole of a perpendicular magnetic recording single-pole write head, so as to be perpendicular to the recording medium. In this technology of the prior art, the near-field light generating element and the main pole of the perpendicular magnetic recording single-pole magnetic write head are placed at a distance in the linear recording direction. At the same time, a structure is employed in which the main pole is positioned on the substrate side from the near-field light generating element (the light irradiation portion is positioned on the trailing side of the magnetic pole). In this case, when the disk rotation direction in hard disk drives of the prior art is adopted, after heating the medium, the magnetic field is applied after the heating portion has passed through approximately one rotation of the disc. This is a method of use in which in which the cooling efficiency of the medium must be made considerably poor in order to enable use; if the write speed is considered, this structure is not realistic. Moreover, for the construction of Japanese Patent Laid-open No. 2004-158067, the magnetic field which can be applied is not adequate, and in particular, application of this head is difficult for recording media having two-stage coercivity-temperature characteristics such as described in Jan-Ulrich Thiele et al, "Magnetic and structural properties of FePt/FeRh exchange spring films for thermally assisted magnetic recording media", IEEE Transactions on Magnetics, 2004, Vol. 40, No. 4, pp. 2537-2542).

In Japanese Patent Laid-open No. 2005-4901, a light irradiation portion is provided in proximity to the trailing-side end of the recording magnetic pole. Using this technology, by improving the recording magnetic field gradient and similar, a magnetic field can be applied to the heating portion, but the design margin is not necessarily large, and practical realization is not easy.

When a near-field light-generating element is positioned on the substrate side from the main pole, it is preferable that the recording magnetic field be imparted from the magnetic pole after the medium is heated; however, if there is too great a distance between the two elements, the effect of heating is lost. Also, in order to adopt a construction in which the near-field light-generating element is positioned on the substrate side of the main pole, a path for the light to propagate, that is, an optical waveguide, must also be provided on the side below the perpendicular magnetic recording single-pole write head (the substrate side). Such a construction is for example described in Japanese Patent Laid-open No. 2005-190655.

In Japanese Patent Laid-open No. 2006-185548, technology is disclosed in which an optical waveguide is embedded within the main pole of a perpendicular magnetic recording single-pole write head; however, it is extremely difficult to form such an optical element in a main pole of width 20 nm or less to attain a recording density of 1 Tbits/in$^2$, and from the standpoint of efficiency of light use as well, such a design is not desirable.

As explained above, although various technologies are known, a thermally assisted magnetic head capable of performing practical high-density recording has not been obtained. When considering a construction in which a near-field light-generating portion (plasmon probe) is irradiated with laser light, it is thought to be preferable to provide the near-field light-generating portion in the tip face of the core of the optical waveguide through which the laser light propagates. The optical waveguide is formed by enveloping a region of high refractivity (core) within a region of low refractivity (cladding). In order to ensure functioning as an optical waveguide, the thicknesses of the two regions must be designed to be approximately equal to or greater than the wavelength of the light used.

Hence when using a blue laser as the light source in high-density optical recording, for example, a core and cladding thickness of approximately 400 nm or greater each are required; in this case, the near-field light-generating portion and the main pole are greatly separated, and there is the problem that a magnetic field cannot effectively be applied to the heated medium region.

SUMMARY OF THE INVENTION

This invention was devised in light of the above problems, and has as an object the provision of a thermally assisted magnetic head capable of high-density recording, as well as a method for manufacturing such a head.

In order to resolve the above problems, a thermally assisted magnetic head of this invention is characterized in comprising first and second near-field light-generating portions, positioned on a medium-opposing surface spaced apart from each other, and a main pole, at least a portion of which is positioned between the first and second near-field light-generating portions.

In this thermally assisted magnetic head, when the first and second near-field light-generating portions are irradiated with laser light or other energy rays, near-field light is generated at the tips of both of the near-field light-generation portions. By means of the generated near-field light, the magnetic recording medium opposing the medium-opposing surface is heated, and the coercivity of the magnetic recording medium falls. At least a portion of the main pole is positioned in the region between the first and second near-field light-generating portions, so that the tips of the two near-field light-generating portions and the main pole are in extremely close proximity. Hence a sufficient magnetic field can be applied from the main pole prior to cooling of the recording region in the heated state, and so even through the fine magnetic particles in the recording region are small, information writing can be performed, and high-density recording is possible.

Also, a thermally assisted magnetic head of this invention is characterized in further comprising, in a region between the first near-field light-generating portion and the second near-field light-generating portion, a light-emitting element which emits laser light or another energy ray. That is, through irradiation with an energy ray, adequate near-field light can be generated in the near-field light-generating portions.

Also, a thermally assisted magnetic head of this invention is characterized in comprising: a core, the tip face of which is provided with the first and second near-field light-generating portions; and cladding provided on the periphery of the core, and in that the main pole is provided in a groove the deepest portion of which is positioned within the core and that the first and second near-field light-generating portions are positioned adjacent to both the side faces of the groove.

An energy ray propagating within the core advances to the end face while being reflected by the cladding on the periphery. At the end face, the first and second near-field light-generating portions are provided, and so near-field light is generated corresponding to irradiation of these by the energy ray. In constructions of the prior art, the near-field light-generating portion and the main pole could not be brought close together, but in this invention, a groove is provided with the deepest portion positioned in the core, and the main pole is provided therewithin, so that the first and second near-field light-generating portions and the main pole can be brought close together, and moreover there is the advantage that, by means of a groove positioning function at the time of manufacture, the precision of positioning can be made extremely high.

Also, a thermally assisted magnetic head of this invention is characterized in further comprising an information writing coil which serves to pass magnetic flux through the main pole. No limitations in particular are placed on the position of the information writing coil. That is, when a current is passed in the coil, magnetic flux is generated therewithin; the flux passes through the magnetic material interior serving as an appropriate core material, and it is sufficient that the flux flows from the tip of the main pole to the outside. By controlling the quantity and direction of the current flowing in the coil, desired information can be written to the magnetic recording medium.

A manufacturing method in which, while performing precise positioning, the main pole and the near-field light-generating portions are brought close together as described above, was first discovered by these inventors.

A method for manufacturing a thermally assisted magnetic head of this invention is characterized in comprising a process of forming a core on cladding; a process of forming a metal layer on the core; a process of forming a mask having a slit pattern, on the metal layer; a process of etching the metal layer and core through the mask, until the core interior immediately below the slit pattern is reached; a process of forming an insulating layer in a groove formed by etching; and a process of forming magnetic material serving as a main pole, on the insulating layer in the groove.

By means of this etching, the metal layer is divided in the region immediately below the mask, and the first and second near-field light-generating portions are formed. Because the thickness of the insulating layer can be controlled with high precision, the main pole positioned in the groove and the first and second near-field light-generating portions can be brought extremely close together, and moreover, precise positioning is performed through self-alignment using this etched groove.

By means of a thermally assisted magnetic head of this invention, high-density recording is possible, and a method of manufacture thereof enables manufacture of thermally assisted magnetic heads capable of high-density recording.

DESCRIPTION OF THE PREFERRED EMBODIMENTS

Below, near-field light-generating elements, thermally assisted magnetic heads, head gimbal assemblies, and hard disk devices of aspects are explained. The same elements are assigned the same symbols, and redundant explanations are omitted.

Figure 1:
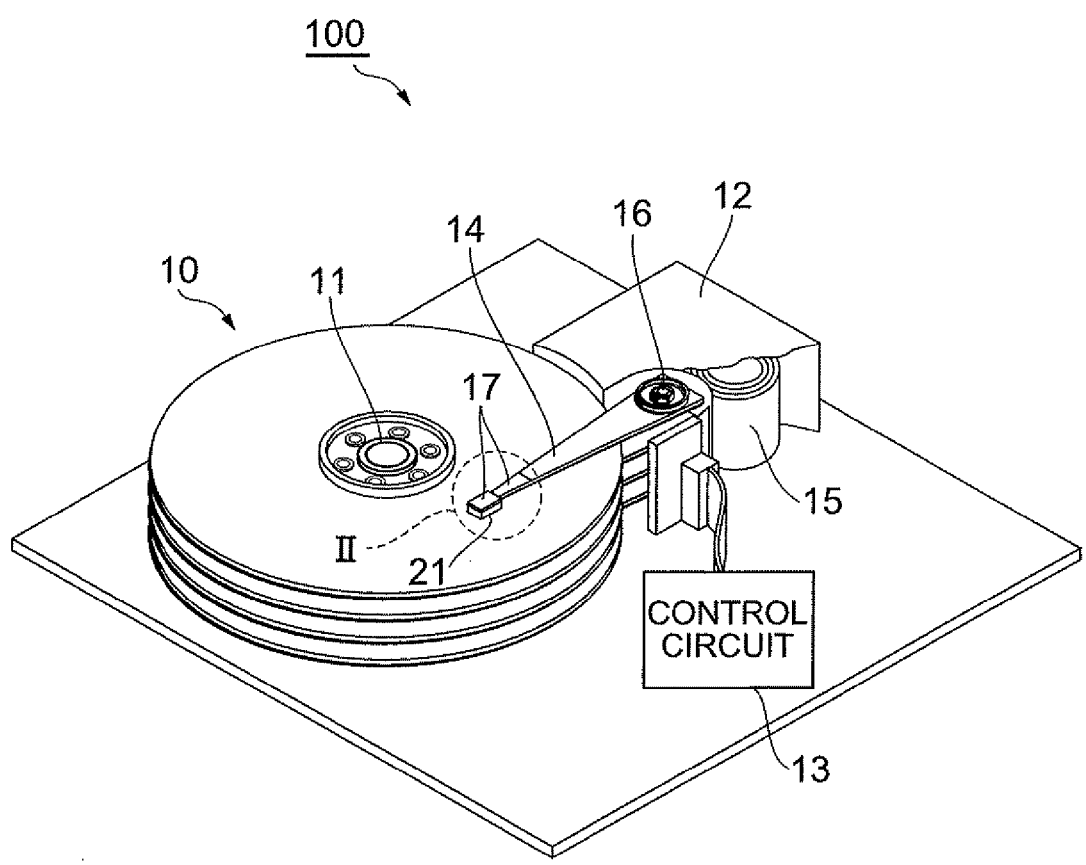
FIG. 1 is a perspective view of the hard disk device of an aspect.

FIG. 1 is a perspective view of a hard disk device of an aspect.

The hard disk device 100 comprises magnetic disks 10, which are a plurality of magnetic recording media which rotate about the rotation shaft of a spindle motor 11; an assembly carriage device 12, to position a thermally assisted magnetic head 21 above a track; and a read/write and light emission control circuit (control circuit) 13, to control write and read operations by this thermally assisted magnetic head 21, and to control a laser diode which is the light source generating laser light for thermally assisted magnetic recording, described in detail below.

A plurality of driving arms 14 are provided in the assembly carriage device 12. These driving arms 14 can be pivoted about the center of a pivot bearing shaft 16 by means of a voice coil motor (VCM) 15, and are stacked in the direction along this shaft 16. At the tip portions of each of the driving arms 14 is mounted a head gimbal assembly (HGA) 17. On each HGA 17 is provided a thermally assisted magnetic head 21, so as to be opposed to the surface of each magnetic disk 10. The surface opposing the surface of a magnetic disk 10 is the medium-opposing surface S (also called the air-bearing surface) of the thermally assisted magnetic head 21. Only one magnetic disk 10, driving arm 14, HGA 17, and thermally assisted magnetic head 21 may instead be provided.

Figure 2:
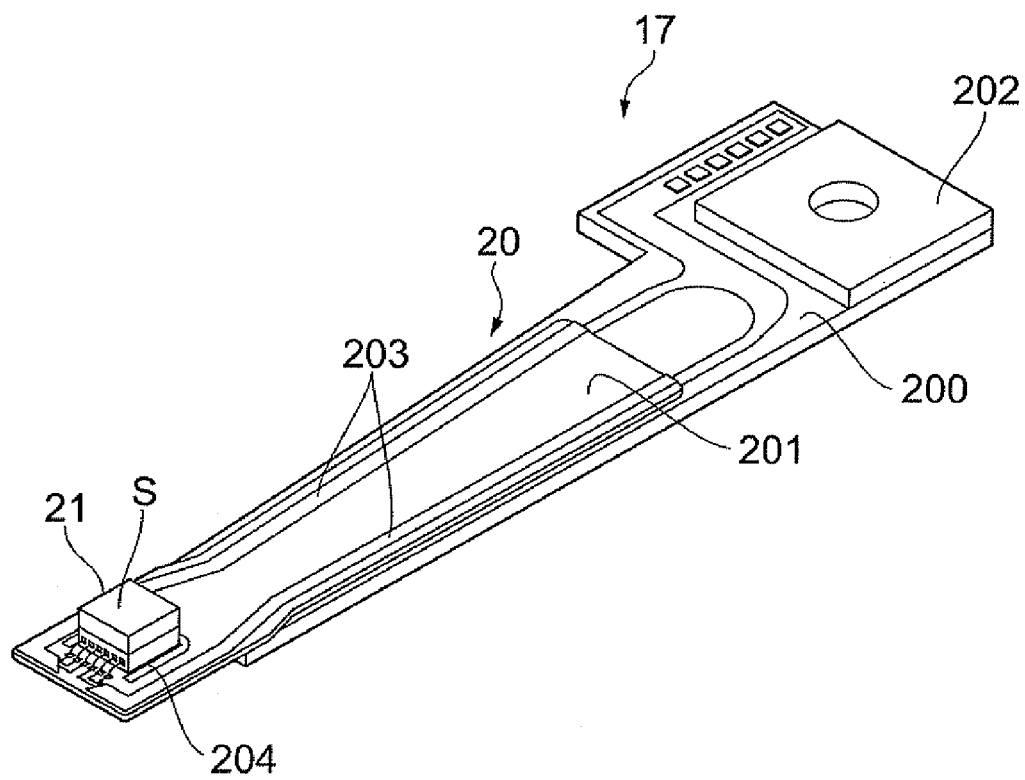
FIG. 2 is a perspective view of the HGA 17.

FIG. 2 is a perspective view of an HGA 17. In the figure, the HGA 17 is shown with the medium-opposing surface S upward.

The HGA 17 is configured with the thermally assisted magnetic head 21 fixed to the tip portion of a suspension 20, and with one end of the wiring member 203 electrically connected to terminal electrodes of the magnetic head 21. The suspension 20 primarily comprises a load beam 200; a flexure 201, fixed to and supported by the load beam 200 and having elasticity; a tang portion 204, formed into a leaf-spring shape at the tip of the flexure; a base plate 202, provided on the base portion of the load beam 200; and a wiring member 203, provided on the flexure 201, and comprising lead conductors and connection pads electrically connected to both ends thereof.

The construction of the suspension in the HGA 17 is clearly not limited to the above-described construction. Also, although not shown, a head driver IC chip may be mounted midway on the suspension 20.

Figure 3:
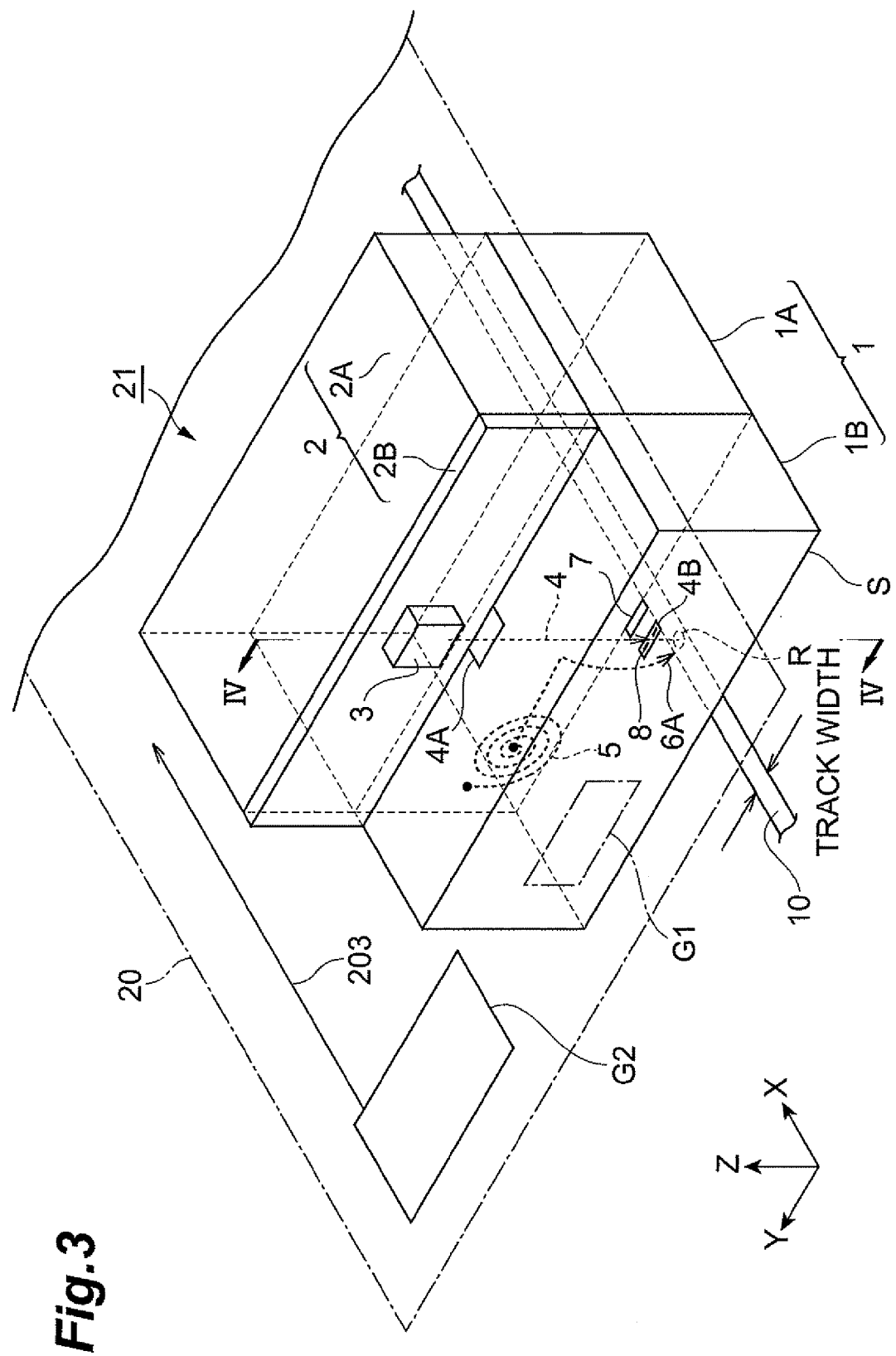
FIG. 3 is an expanded view of the vicinity of the thermally assisted magnetic head 21 shown in FIG. 1.

FIG. 3 is an enlarged perspective view of the vicinity of the thermally assisted magnetic head 21 shown in FIG. 1.

The thermally assisted magnetic head 21 is mounted on the tip portion of the suspension 20. The thermally assisted magnetic head 21 is formed by affixing a slider 1 to a light source unit 2. The slider 1 comprises a magnetic head portion 1B, formed in the YZ plane of the slider substrate 1A. The XY plane in the −Z direction of the magnetic head portion 1B forms the medium-opposing surface S. On the other hand, the light source unit 2 comprises an insulating layer 2B on the YZ plane of the light source support substrate 2A, and a light-emitting element 3 is fixed onto the YZ plane of the insulating layer 2B.

The magnetic head portion 1B comprises a plurality of elements, buried in an insulator. These elements are a spiral-shape coil 5, which generates a magnetic field by means of a supplied current; a main pole 6A, extending from the center of the coil so as to guide magnetic flux generated by the information-writing coil 5 to the medium-opposing surface S; a magnetoresistance element (MR element) 7, having a magnetic sensing face exposed on the medium-opposing surface S; and a waveguide core 4, employing the peripheral insulator as cladding, which extends along the Z-axis direction.

The core 4 can also be formed by laminating a plurality of dielectric layers with different refractive indices; in this case, light propagating inside is refracted toward the higher average refractive index per unit thickness. The core comprises dielectric layers with higher overall average refractive index than the cladding, and the cladding comprises dielectric layers with lower refractive index than the core as a whole. When the core is formed from numerous dielectric layers, the thickness and refractive index of the plurality of dielectric layers are set such that light propagating inside approaches the near-field light-generating portions. That is, the closer to the near-field light-generating portions, the higher is the average refractive index per unit thickness in the core 4.

The main pole 6A is exposed on the medium-opposing surface S; but if the main pole 6A is at a position such that a magnetic field can be applied to the recording region R on the surface of the magnetic disk 10, there is no need to expose the main pole 6A on the medium-opposing surface S. Further, an auxiliary magnetic pole may be provided in the vicinity of the main pole 6A as necessary, so that magnetic force lines (magnetic flux) MF from the main pole 6A flow through the auxiliary pole via the recording region R (see FIG. 5).

The core 4 has a light incidence surface 4A, on which light from the light-emitting element 3 is incident, in the XY plane in the positive Z-axis direction, and comprises a light emission surface 4B in the negative-direction XY plane, that is, on the medium-opposing surface S. In this example, the light-emitting element 3 is a face-emission type laser diode; laser light emitted from the end face parallel to the XY plane passes through the light incidence surface 4A to enter the core 4, and irradiates the near-field light-generating element 8 (near-field light-generating portions 8A, 8B) formed on the light emission surface 4B. The pair of near-field light-generating portions 8A, 8B are 15 separated along the Y-axis direction (see FIG. 6).

The near-field light-generating element 8 resonates with the incident light to generate near-field light, and by means of this near-field light the recording region R is heated. When magnetic force lines from the tip of the main pole 6A enter the heated recording region R, information is written to the recording region R.

An electrode pad group G1, comprising a plurality of electrode pads, is formed in the YZ plane in the negative X-axis direction of the magnetic head portion 1B. The electrode pads are connected to the two ends of the coil 5 and to the upper and lower electrodes of the MR element 7. The M element 7 is formed by layering a pinned layer, the magnetization of which is pinned, and a free layer, the magnetization direction in which is deflected according to the peripheral magnetic field; the magnetoresistance changes according to the difference in directions of magnetization in the free layer and in the pinned layer. That is, the magnetoresistance of the MR element 7 changes in accordance with the magnetic field generated in the environs of the recording region R, so that the current flowing between one pair of electrode pads in the electrode pad group GI changes. Hard magnets are positioned at both ends of the free layer in the Y-axis direction.

During writing, current flows between a separate pair of electrode pads of the electrode pad group G1, so that current flows through both ends of the coil 5. It is preferable that the magnetic recording element be a perpendicular magnetic recording type element. The electrode pads of the electrode pad group G1 are electrically connected to a second electrode pad group G2 formed on the suspension 20, and connected to the outside via the wiring member 203. The second electrode pad group G2 connected to the wiring member 203 also comprises a pair of electrode pads to supply a driving current to the light-emitting element 3; by passing a driving current between these electrode pads, the light-emitting element 3 is caused to emit light, and laser light is emitted as an energy ray.

Various shapes are possible for the core 4; in this example, the core extends in a straight line along the Z axis. To clarify the explanation, the core 4 is indicated by the same symbol as the optical path of the light LB (see FIG. 4) from the light-emitting element 3.

The slider substrate 1A and light source support substrate 2A are for example formed from AlTiC ($Al_2O_3$—TiC). When substrates with high thermal conductivity are used as these substrates 1A and 2A, the substrates have a heat-dissipating function. The XY plane in the positive Z-axis direction of the light source support substrate 2A is affixed to the rear surface of the suspension 20.

The magnetic head portion 1B is formed by layering the MR element 7, cladding, core 4, coil 5, and main pole 6A along the X axis; this layering direction is along the direction of arrangement of the recording region R in a track, and the track width is parallel to the Y axis.

Figure 4:
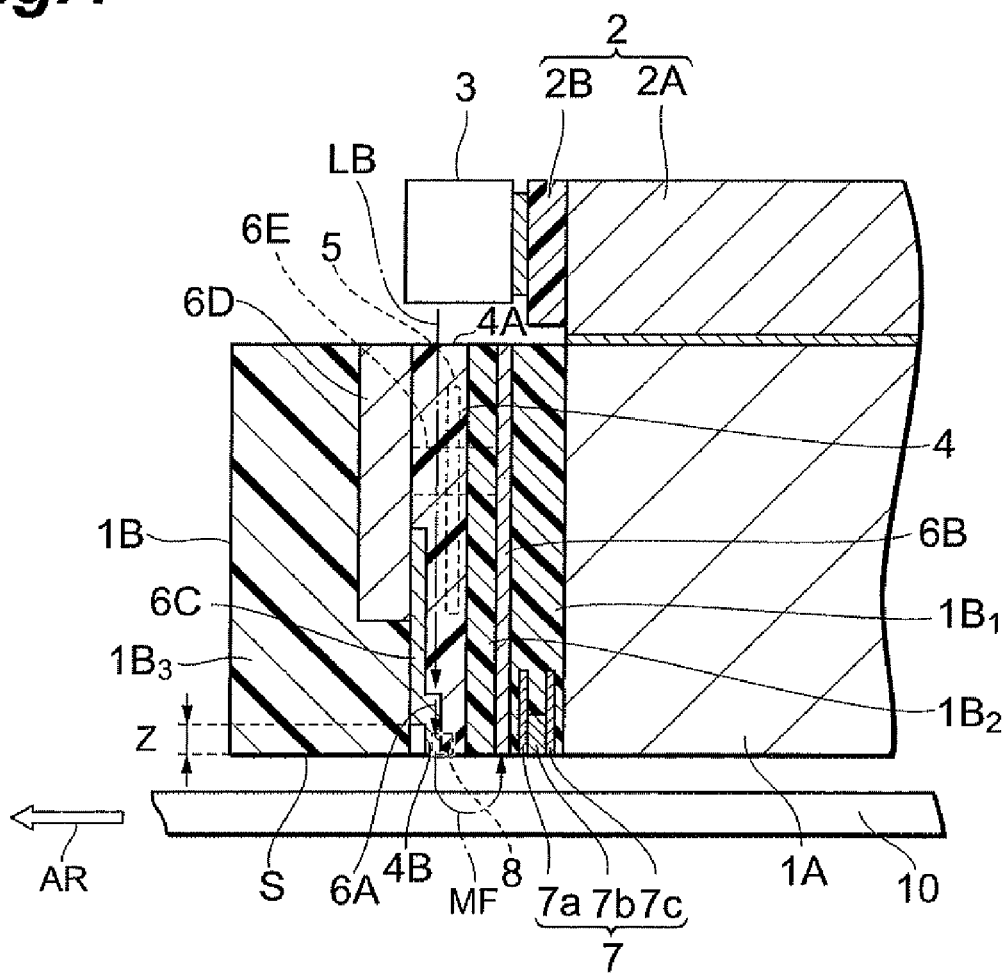
FIG. 4 is a cross-sectional view along the arrow IV-IV of the thermally assisted magnetic head shown in FIG. 3.

FIG. 4 is a cross-sectional view along the arrow IV-IV of the thermally assisted magnetic head shown in FIG. 3.

The light-emitting element 3 is bonded and fixed onto the insulating layer 2B, energy rays emitted in the −Z direction from the light-emitting element 3 pass through the light incidence surface 4A of the core 4 to enter the core 4, and irradiate the near-field light-generating element 8 provided at the light emission surface 4B of the core 4.

The tip of the main pole 6A is adjacent, in the Y-axis direction, to the near-field light-generating element 8. The main pole 6A is physically continuous with the magnetic material layer 6C for magnetic flux transmission, and the magnetic material layer 6C is physically continuous with the upper magnetic material layer 6D of larger volume. The upper magnetic material layer 6D is physically continuous, via the penetrating magnetic material 6E, with the lower magnetic material layer 6B forming the auxiliary magnetic pole. The penetrating magnetic material 6E is provided in a through-hole which penetrates the insulating layer $1B_2$ in the X-axis direction as the cladding in which the core 4 is buried. The insulating layer $1B_2$ serving as cladding surrounds the periphery of the core 4.

An overcoat layer $1B_3$, comprising an insulating material, is provided on the upper magnetic material layer 6D. A lower insulator layer $1B_1$ intervenes between the lower magnetic material layer 6B and the substrate 1A. The MR element 7 is buried in the lower insulator layer $1B_1$. The M element 7 comprises an upper shield electrode 7a, lower shield electrode 7c, and an M element layer 7b intervening between the upper shield electrode 7a and the lower shield electrode 7c. The MR element layer 7b is formed by layering a free layer and a pinned layer, with a tunnel barrier layer intervening. The insulator layers $1B_1$, $1B_2$, $1B_3$ in this example comprise low-refractivity $Al_2O_3$, and the core 4 comprises high-refractivity tantalum oxide ($TaO_x$). The material of the magnetic pole comprises an alloy of two or three elements from among Ni, Fe, and Co, or an alloy the main components of which are these elements and with prescribed elements added, or similar.

Figure 5:
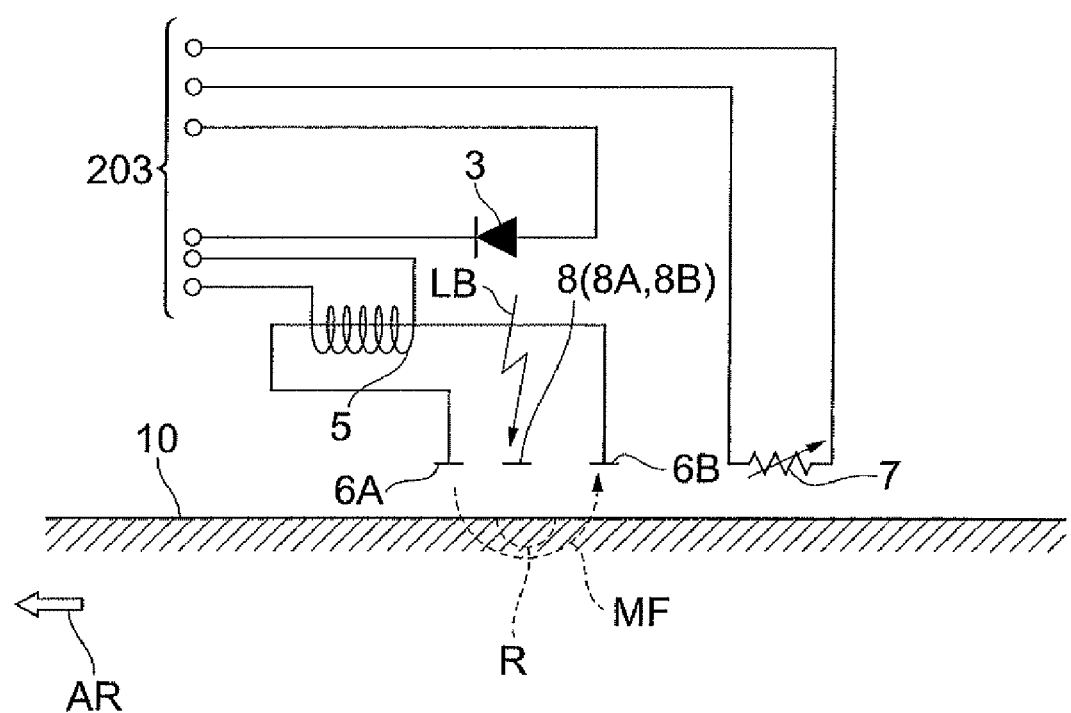
FIG. 5 shows electrical connections in a thermally assisted magnetic head.

FIG. 5 shows electrical connections in the thermally assisted magnetic head.

Both ends of the light-emitting element 3, coil 5, and M element 7 are connected to each other by the wiring member 203. Current is passed through the light-emitting element 3 and the coil 5 via the wiring member 203, and the output from the MR element 7 is read via the wiring member 203.

When current is passed through the light-emitting element 3, an energy ray LB irradiates the near-field light-generating element 8, and the recording region R of the magnetic disk 10 in close proximity thereto is heated. The magnetic disk 10 moves in the direction of the arrow AR in the figure, so that immediately after heating, the tip of the main pole 6A is positioned above the heated recording region R. At this time, when a current is passed through the coil 5, magnetic flux passing through the magnetic material 6E passes through the magnetic material 6D to reach the tip of the main pole 6A, and magnetic force lines MF leaving the tip of the main pole 6A pass through the magnetic disk 10, and return via the auxiliary pole 6B and the penetrating magnetic material 6E. Hence information is written to the recording region R of the magnetic disk 10.

In this way, the thermally assisted magnetic head further comprises a light-emitting element 3 which irradiates the region between the first near-field light-generating portion 8A and the second near-field light-generating portion 8B with laser light or another energy ray, and through irradiation by the energy ray LB, near-field light can be adequately generated at the near-field light-generating portions 8A and 8B.

When the recording region R with information recorded is opposed to the MR element 7, the direction of magnetization in the free layer within the MR element 7 changes according to the magnetic field from the recording region R, and the magnetoresistance of the MR element 7 changes. Hence information written to the recording region R can be read.

Figure 6:
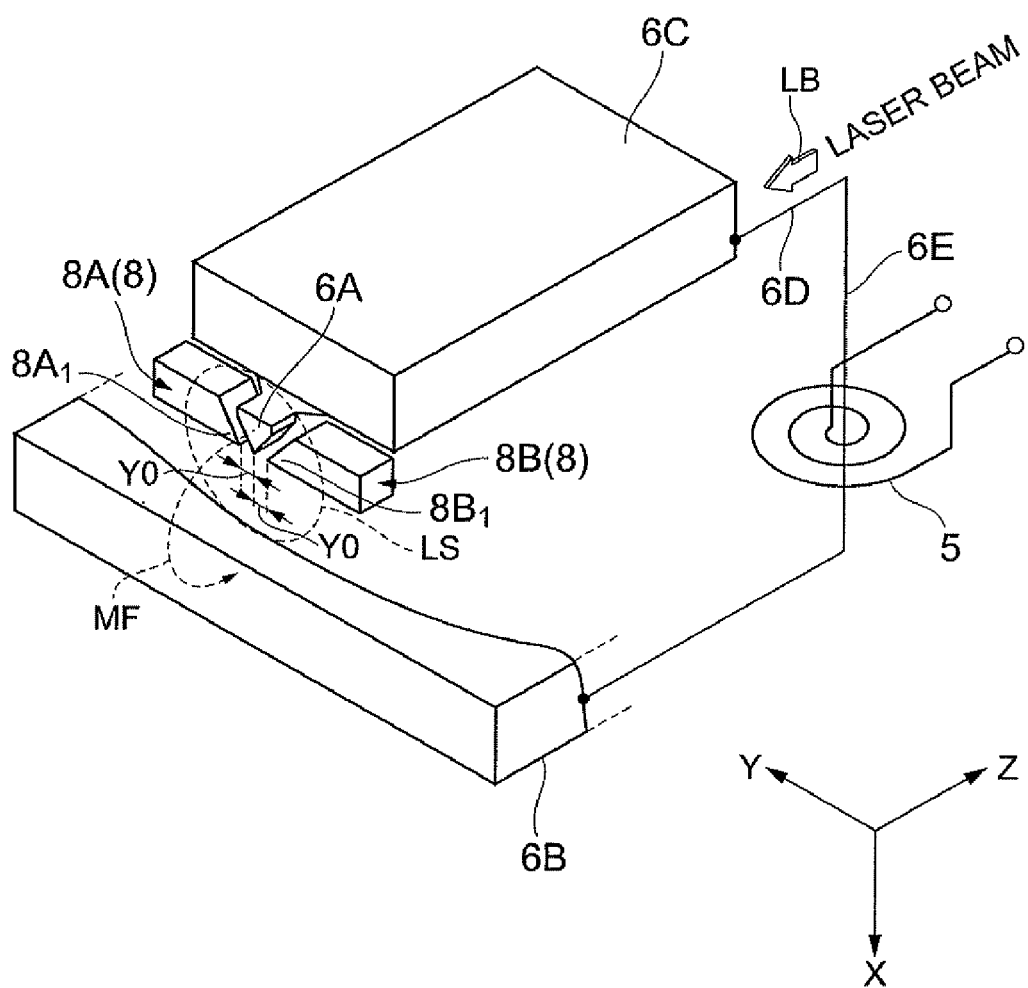
FIG. 6 is a perspective view of the vicinity of a near-field light-generating element 8.

FIG. 6 is a perspective view of the vicinity of the near-field light-generating element 8.

The near-field light-generating element 8 comprises a first near-field light-generating portion 8A and a second near-field light-generating portion 8B, positioned on the medium-opposing surface spaced apart from each other. The tip of the main pole 6A is positioned between the first near-field light-generating portion 8A and the second near-field light-generating portion 8B. The entirety of the tip of the main pole 6A may be positioned between the first near-field light-generating portion 8A and the second near-field light-generating portion 8B. The shape in the XY plane of the tip of the main pole 6A is substantially triangular, and the direction from the base edge thereof toward the vertex coincides with the X axis. Here a substantially triangular shape is a triangular shape in which the angular portions are rounded, or the angular portions of a pentagonal shape are rounded.

The magnetic material layer 6C acting as a magnetic yoke positioned above the main pole 6A is shown with substantially a rectangular parallelepiped shape; but no limitations in particular are placed on the shape, so long as the volume is larger than that of the main pole 6A. The shortest distance from the medium-opposing surface (XY plane) of the magnetic material layer 6C is larger than the distance (substantially zero) from the medium-opposing surface to the tip of the main pole 6A. The laser light serving as the energy ray LB passes through the core to irradiate the opposing portions $8A_1$ and $8B_1$ of the near-field light-generating portions 8A and 8B. The opposing portions $8A_1$ and $8B_1$ are positioned within the light spot region LS in the light emission surface of the core. The opposing portions $8A_1$ and $8B_1$ have shapes which are pointed in the XY plane, and the directions of the points of these tip portions are both directed toward the tip of the main pole 6A.

When the energy ray LB is laser light, the short axis of the far-field pattern coincides with the Y-axis direction, and is the TE polarization direction. When near-field light-generating portions 8A, 8B comprising Au or another metal are irradiated with light, electrons in the metal forming the near-field light-generating portions 8A, 8B undergo plasma oscillation, and concentration of the electric field at the tip portion occurs. The broadening of the near-field light extends approximately to the radius of the respective opposing portions (tip portions) $8A_1$ and $8B_1$, so that if the radii of the opposing portions $8A_1$ and $8B_1$ are made equal to or less than the track width, and the separation distance between the opposing portions $8A_1$ and $8B_1$ is made equal to or less than the track width, then an effect results in which the emitted light is effectively limited to the diffraction limit or less. For convenience of explanation, the dimensions of each element are made different from the actual dimensions.

When passing a current through the coil 5, a magnetic circuit is formed having, in sequence, the magnetic materials 6E, 6D, 6C, 6A, 6B, and the projection onto the XY plane of the path of magnetic force liens MF extending from the tip of the main pole 6A overlaps the spot region LS.

As explained above, in the above-described thermally assisted magnetic head, when the first and second near-field light-generating portions 8A, 8B are irradiated with laser light or another energy ray LB, near-field light is generated at the tips of both near-field light-generating portions 8A, 8B. By means of the near-field light thus generated, the magnetic recording medium opposing the medium-opposing surface is heated, and the coercivity of the magnetic recording medium falls. At least a portion of the main pole 6A is positioned within the spot region LS comprising the region between the first and second near-field light-generating portions 8A, 8B, so that the tips of the two new-field light-generating portions 8A, 8B and the main pole 6A are in extremely close proximity. That is, the recording region of the heated magnetic recording medium and the main pole 6A are in extremely close proximity. Hence the main pole 6A can apply an adequate magnetic field prior to cooling of the recording region in the heated state, so that information can be written even when the fine magnetic particles in the recording region are small, and so high-density recording is possible.

By making the length ZO in the Z-axis direction of the tip portion of the main pole 6A (the shortest distance in the Z direction from the tip of the main pole 6A exposed in the Z direction to the magnetic material layer 6C comprised by the magnetic yoke; see FIG. 4) equal to or greater than 0 μm and equal to or less than 0.5 μm, adequate light intensity and magnetic field intensity can be obtained. Further, the minimum value of the separation distance Y0 in the Y-axis direction between the near-field light-generating portions 8A, 8B and the main pole 6A (see FIG. 6) is made equal to or greater than 0.001 μm and equal to or less than 0.1 μm. There is no contact therebetween. By this means, while causing the near-field light-generating portions 8A, 8B to function effectively, a magnetic field can be effectively applied to the heated medium region. By this means, recording densities of 1 Tbits/$in^2$ or higher can be attained.

Next, a method for manufacturing the above-described thermally assisted magnetic head is described.

FIG. 7A to FIG. 10 are perspective views of intermediate members of a thermally assisted magnetic head, used to explain a method for manufacturing a thermally assisted magnetic head. Other elements exist on the periphery of the element shown in the perspective views, but to clearly illustrate the characteristic portions, illustrations of these are omitted in the figures.

Figure 7A:
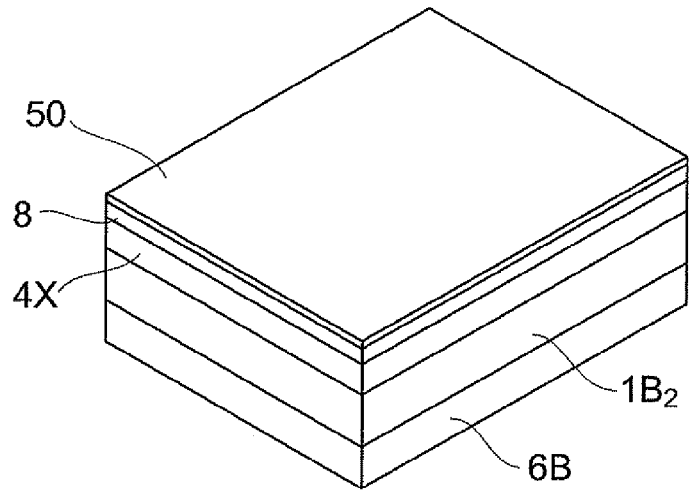
FIG. 7A is a perspective view of a thermally assisted magnetic head intermediate member, used to explain a method for manufacturing a thermally assisted magnetic head.

As shown in FIG. 7A, an insulating layer (cladding) $1B_2$ of a low-refractivity material, core layer 4X of a low-refractivity material, metal layer 8 for formation of near-field light-generating portions (to simplify the explanation, indicated by the same symbol used for the near-field light-generating portions 8), and polish stop layer 50, are formed in order on the auxiliary pole (assisting magnetic pole) 6B. In this example, $TaO_x$ is used as the core layer 4X, Au is used as the metal layer 8, and Ta is used as the polish stop layer 50. As the method of formation of these layers, a sputtering method can be used.

Figure 7B:
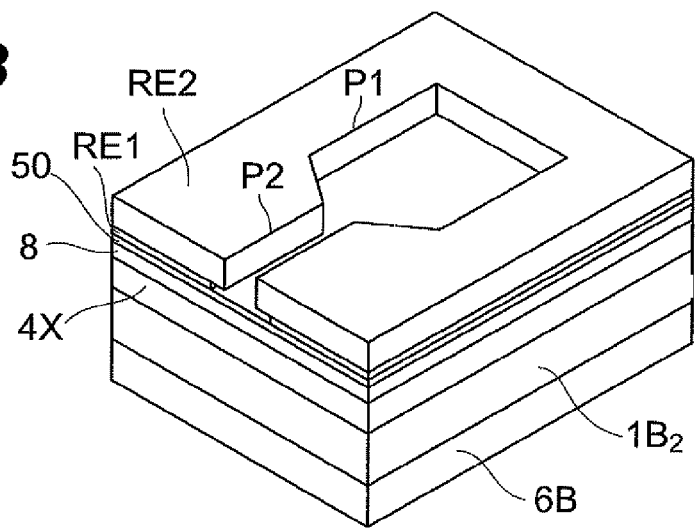
FIG. 7B is a perspective view of a thermally assisted magnetic head intermediate member, used to explain a method for manufacturing a thermally assisted magnetic head.

Next, as shown in FIG. 7B, two resist layers RE1 and RE2, with different solubilities with respect to the etching liquid, are deposited in order, the resist layers are exposed to the desired pattern, and development processing is performed, to form patterned resist layers RE1 and RE2 on the polish stop layer 50. The solubility of the lower resist layer RE1 with respect to the etching liquid is higher than the solubility of the higher resist layer RE2, and during development the resist RE1 is eroded more than the resist RE2, so that the lower portion of the two resist layers is more extensively etched. Such a shape for the two resist layers has the advantage of facilitating separation.

The pattern formed in the resist layers RE1 and RE2 has the shape of a substantially pentagonal base portion pattern P1, to one end of which is connected a slit pattern P2. After lapping, described below, the slit pattern P2 extends perpendicularly to the end face of the layered member which becomes the medium-opposing surface. The resist layers RE1 and RE2 are used as a mask in dry etching.

Figure 7C:
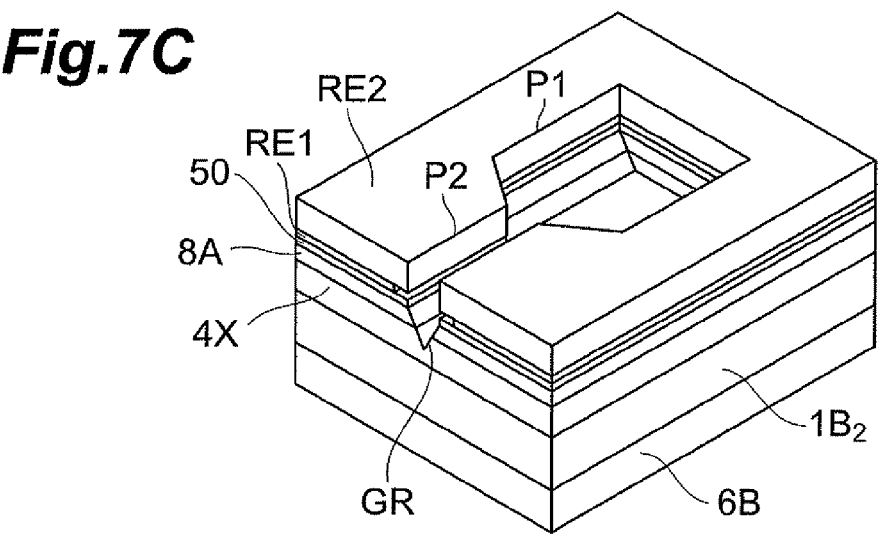
FIG. 7C is a perspective view of a thermally assisted magnetic head intermediate member, used to explain a method for manufacturing a thermally assisted magnetic head.

Next, as shown in FIG. 7C, reactive ion etching (RIE) of the polish stop layer 50, metal layer 8, and core layer 4X is performed, with the two resist layers RE1, RE2 as a mask. As the RIE etching gas, $CH_4$ can be used. These layers are etched while tracing the pattern formed by the resist layers RE1 and RE2, and the layers have a slit pattern P2 which is continuous with one end of the base portion pattern P1.

This etching proceeds until the core layer 4X is reached; a V-shape groove GR is formed immediately below the slit pattern P2, and the deepest portion of the groove GR is positioned within the core layer 4X. By forming the groove GR, the center portion of the end face of the metal layer 8 is divided.

Next, the mask, comprising the resist layers RE1 and RE2, is removed using acetone or another organic solvent.

Figure 8A:
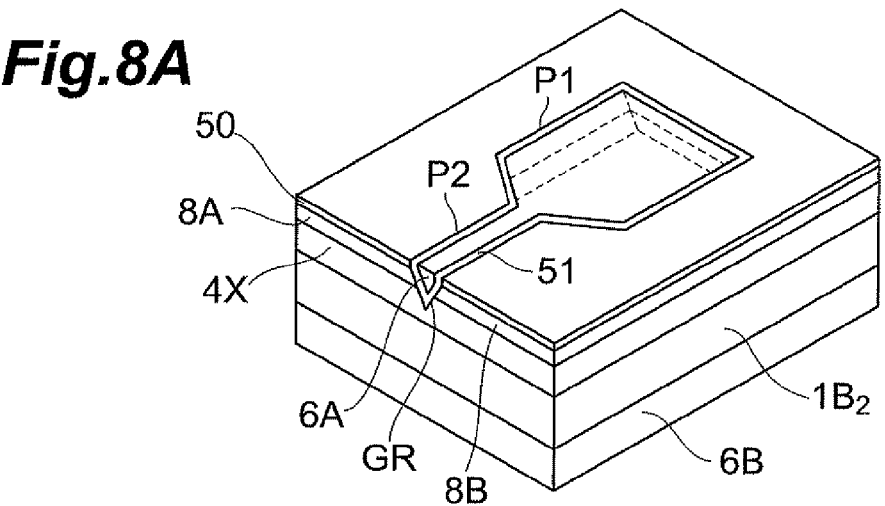
FIG. 8A is a perspective view of a thermally assisted magnetic head intermediate member, used to explain a method for manufacturing a thermally assisted magnetic head.

Next, as shown in FIG. 8A, the CVD (chemical vapor deposition) method is used to deposit an insulating layer 51 on the inner faces of the groove GR and on the polish stop layer 50, and then, the magnetic material forming the pole is deposited on the insulating layer 51, and chemical-mechanical polishing (CMP) is executed until the exposed surface reaches the polish stop layer 50. The polish stop layer 50 comprises material harder than the magnetic material of the magnetic pole and the insulating layer 51.

The insulating layer 51 remains in the base portion pattern P1 and in the slit pattern P2; when the magnetic material is formed on the insulating layer 51, the main pole 6A is formed in the groove GR immediately below the slit pattern P2.

Figure 8B:
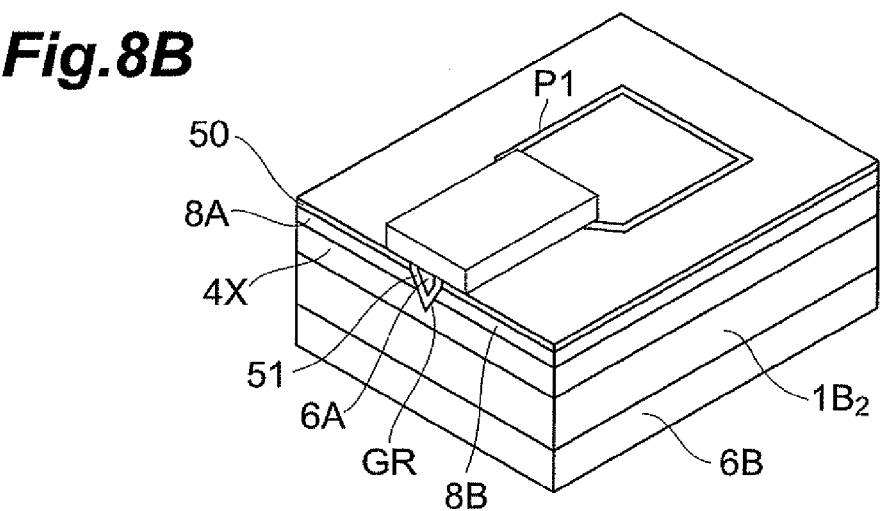
FIG. 8B is a perspective view of a thermally assisted magnetic head intermediate member, used to explain a method for manufacturing a thermally assisted magnetic head.

Next, as shown in FIG. 8B, after applying the resist RE3 onto the polish stop layer 50 and main pole 6A, the resist RE3 is patterned, and the resist RE3 is left on the polish stop layer 50 and main pole 6A so as to cover the slit pattern P2.

Figure 8C:
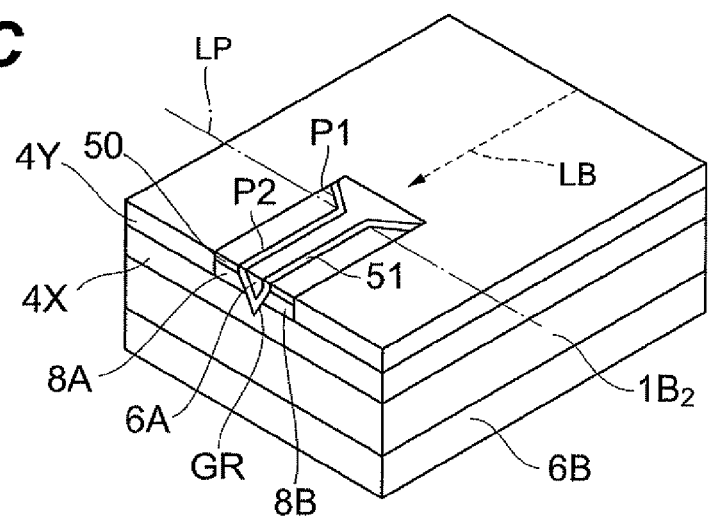
FIG. 8C is a perspective view of a thermally assisted magnetic head intermediate member, used to explain a method for manufacturing a thermally assisted magnetic head.

Next, as shown in FIG. 8C, the resist RE3 is used as a mask to perform etching, using milling by Ar sputtering or similar, of the surrounding polish stop layer 50, metal layer 8, and magnetic material, until the core 4X is reached, to expose the near-field light-generating portions 8A, 8B from the metal layer 8. Next, the core layer 4Y is deposited on the etched region, and then, an organic solvent is used to remove the resist RE3. In the completed device, as shown in FIG. 8C, energy rays LB pass through the core layers 4X and 4Y and propagate in the direction of the main pole 6A, but in the final manufacturing process described below, the element is polished up to a polishing line LP in the figures. The polishing line LP is set close to the boundary between the slit pattern P2 of the main pole 6A and the base portion pattern P2, perpendicular to the direction of advance of the energy rays LB, that is, parallel to the medium-opposing surface.

Figure 9A:
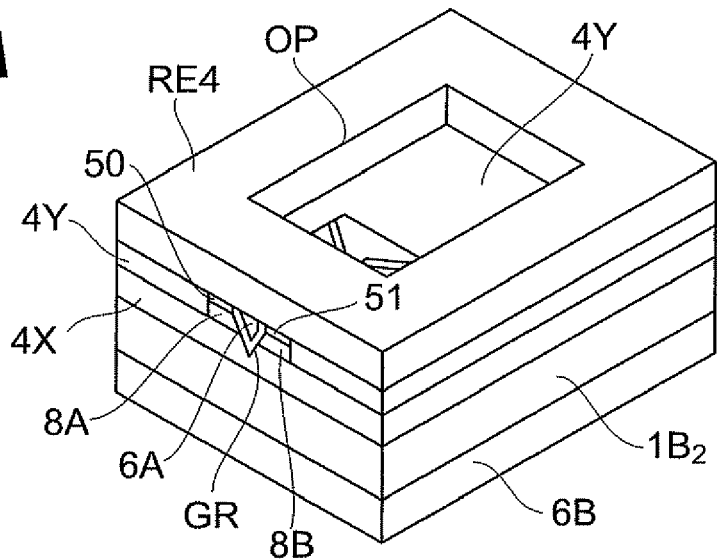
FIG. 9A is a perspective view of a thermally assisted magnetic head intermediate member, used to explain a method for manufacturing a thermally assisted magnetic head.
Figure 9B:
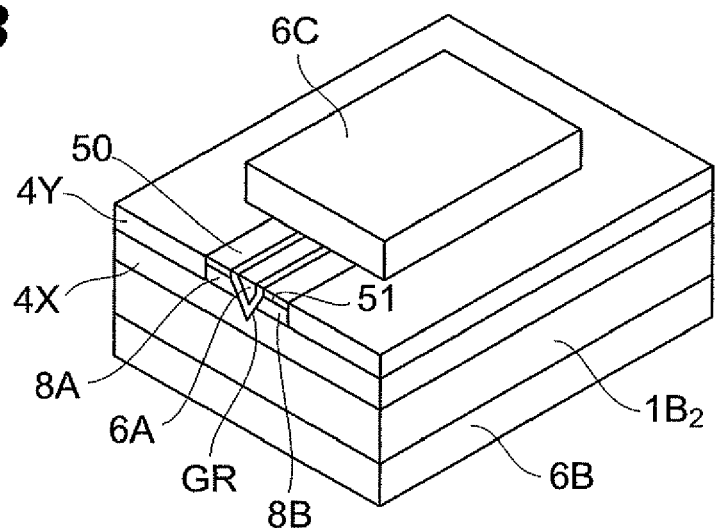
FIG. 9B is a perspective view of a thermally assisted magnetic head intermediate member, used to explain a method for manufacturing a thermally assisted magnetic head.

Next, as shown in FIG. 9A, resist RE4 is applied onto the substrate exposed surface, including the core layer 4Y and polish stop layer 50, and patterning of the resist RE4 is performed such that the slit pattern P2 is opened on the side of the base portion pattern P1, to form the opening OP. Next, as shown in FIG. 9B, the resist RE4 is used as a mask, magnetic material is deposited on top, and when the resist RE4 is removed, a magnetic material layer 6C serving as a magnetic yoke is formed in a state of partial physical contact with the main pole 6A.

Figure 9C:
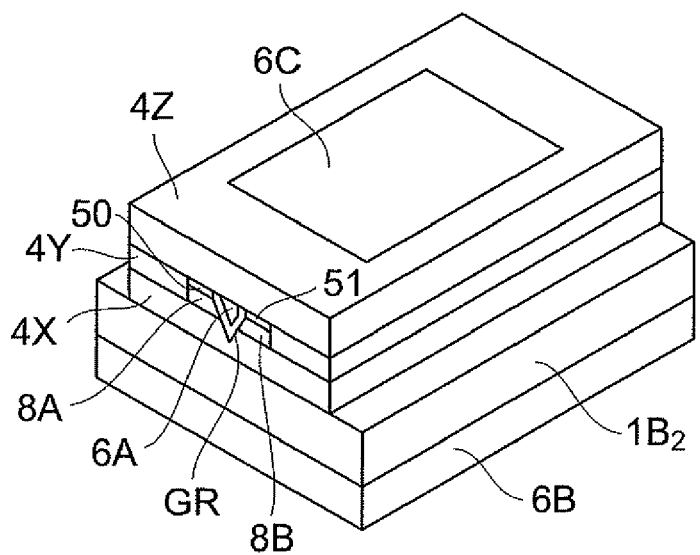
FIG. 9C is a perspective view of a thermally assisted magnetic head intermediate member, used to explain a method for manufacturing a thermally assisted magnetic head.

Next, as shown in FIG. 9C, the core layer 4Z is deposited by sputtering onto the exposed surface of the substrate including the magnetic material layer 6C and core layer 4Y, and chemical-mechanical polishing of the exposed surface of the core layer 4Z is performed until the magnetic material layer 6C is exposed. Thereafter, in order to form a waveguide, the core layers 4Z, 4Y, 4X in the region separated by a prescribed distance in the lateral direction from the light propagation path are etched until the insulating layer $1B_2$, serving as cladding, is reached. A resist pattern is formed in the region not etched. The above-described RIE can be used for this etching.

Thereafter, an insulating layer $1B_4$ serving as cladding is deposited on the periphery of the core 4 comprising the core layers 4Z, 4Y, 4X, and chemical-mechanical polishing of the exposed surface is again performed until the magnetic material layer 6C is exposed. On the magnetic material layer 6C and insulating layer $1B_4$ which have thus been planarized, the upper magnetic material layer 6D is formed (see FIG. 10), and thereafter, an insulating layer $1B_3$ serving as cladding is deposited thereupon (see FIG. 4).

Prior to forming the upper magnetic material layer 6D, a contact hole is formed in the insulating layer $1B_4$ reaching the lower magnetic material layer 6B forming the auxiliary pole, and penetrating magnetic material 6E is formed in the contact hole, to cause the penetrating magnetic material 6E and the lower magnetic material layer 6B to be in physical contact. Hence when the upper magnetic material layer 6D is deposited on the insulating layer $1B_4$, the penetrating magnetic material 6E and the upper magnetic material layer 6D are in physical contact, and the lower magnetic material layer 6B, penetrating magnetic material 6E, and upper magnetic material layer 6D are magnetically joined. The penetrating magnetic material 6E is arranged at the center of the spiral of the planar coil 5, wound in a spiral shape. Each of the magnetic material layers can be formed by a plating method.

Figure 10:
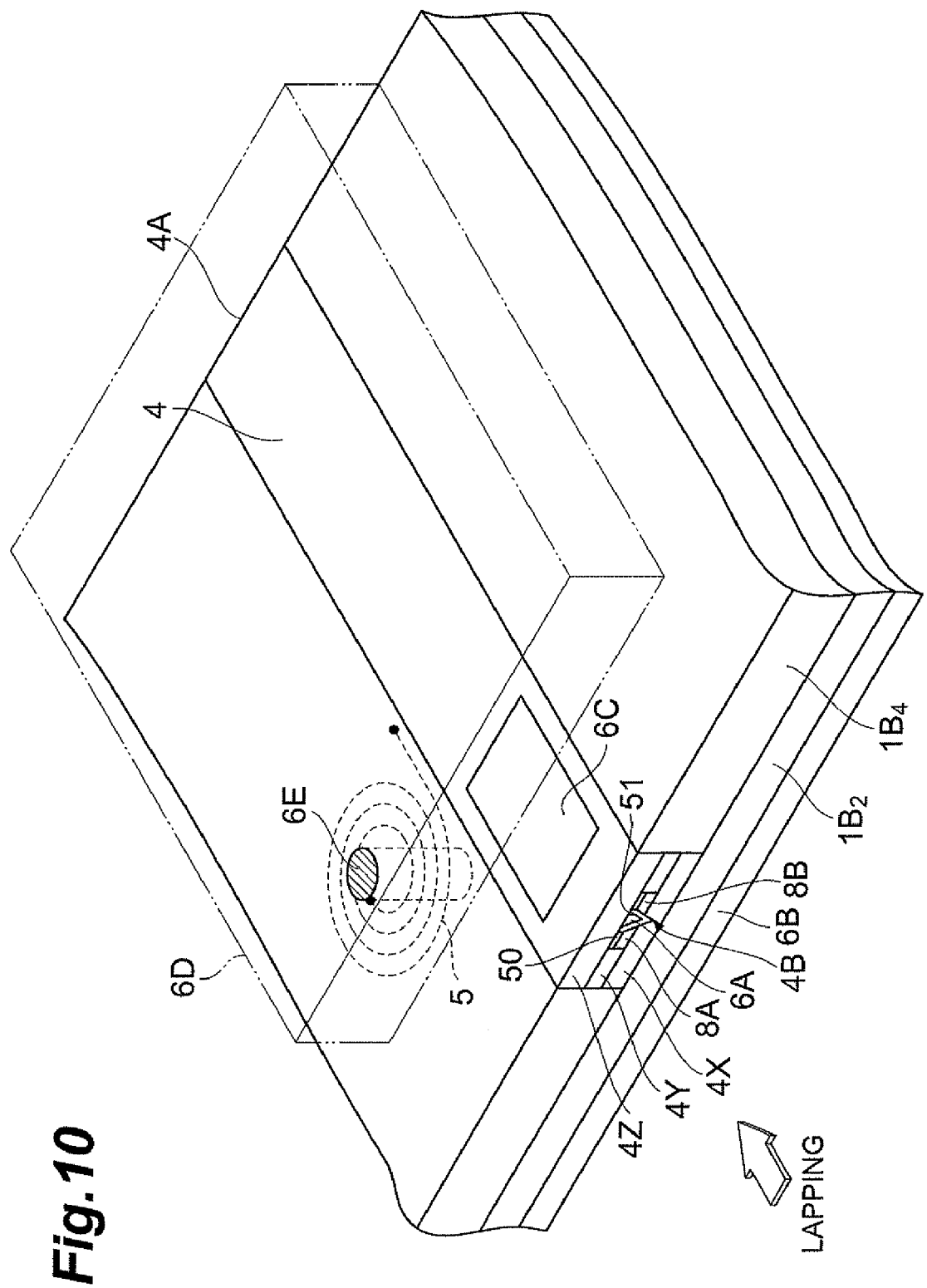
FIG. 10 is a perspective view of a thermally assisted magnetic head intermediate member, used to explain a method for manufacturing a thermally assisted magnetic head.

Finally, the medium-opposing surface is lapped (polished) in the direction of the arrow in FIG. 10, to form the magnetic head portion 1B shown in FIG. 3 on the slider substrate 1A. As shown in FIG. 3, when the light source unit 2 is affixed to the slider 1, the thermally assisted magnetic head is completed.

Figure 11:
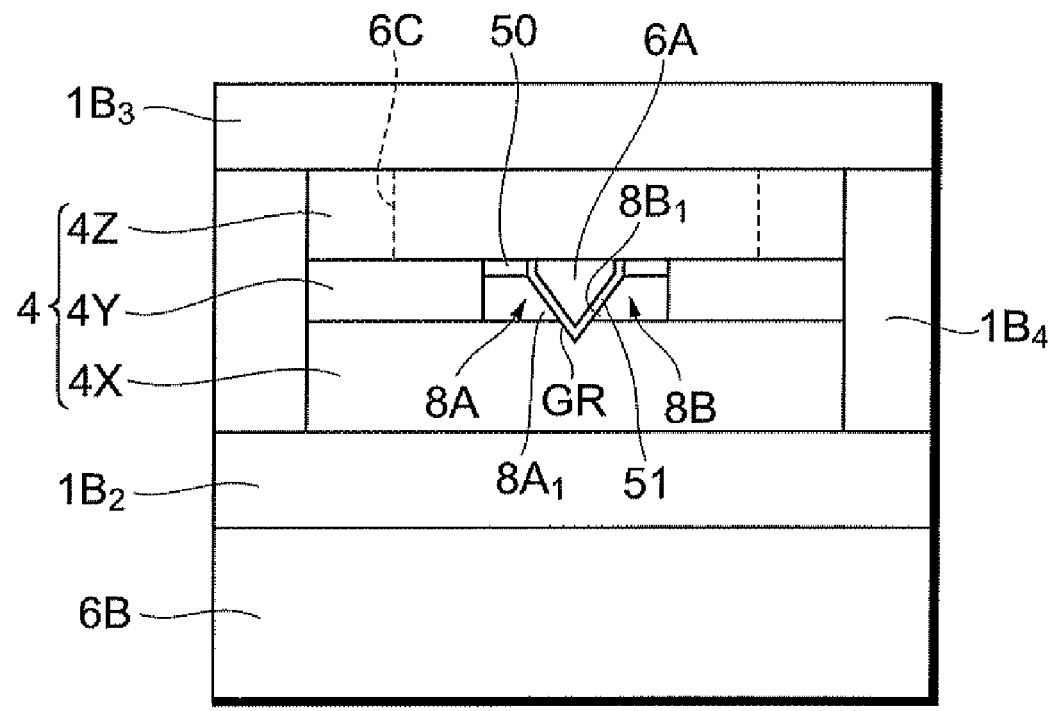
FIG. 11 is a plane view of the medium-opposing surface of a thermally assisted magnetic head in the vicinity of the main pole 6A.

FIG. 11 is a plane view of the medium-opposing surface of the above-described thermally assisted magnetic head in the vicinity of the main pole 6A.

This thermally assisted magnetic head comprises a core 4, with a first near-field light-generating portion 8A and second near-field light-generating portion 8B provided on the tip face, and cladding (insulating layers $1B_2$, $1B_4$, $1B_3$) provided on the periphery of the core 4; the main pole 6A is provided in the groove GR, positioned in the deepest portion of the core 4, and the first near-field light-generating portion 8A and second near-field light-generating portion 8B are positioned adjacent to the respective side faces of the groove GR.

Energy rays propagating within the core 4 advance to the end face (medium-opposing surface) while being reflected by the peripheral cladding (insulating layers $1B_2$, $1B_4$, $B_3$). At the end face are provided the first and second near-field light-generating portions 8A, 8B, and in response to irradiation of these by the energy rays, near-field light is generated. In constructions of the prior art, the near-field light-generating portion and main pole could not be brought close together, but in this example, a groove GR is provided, the deepest portion of which is positioned in the core 4, and the main pole 6A is provided therewithin, so that the first and second near-field light-generating portions 8A, 8B and the main pole 6A can be brought close together, and moreover, Through a function of positioning of the groove GR at the time of manufacture, there is the advantage that the precision of this positioning is extremely high The insulating layer 51 is formed from $Al_2O_3$, and functions as a spacer.

As explained above, the method for manufacturing a thermally assisted magnetic head of the above-described aspect comprises a process of forming a core (core layer 4X) on cladding (insulating layer $1B_2$); a process of forming a metal layer 8 on the core (core layer 4X); a process of forming a mask having a slit pattern P2 on the metal layer 8; a process of etching the metal layer 8 and core (core layer 4X), through the mask, until the interior of the core (core layer 4X) immediately below the slit pattern P2 is reached; a process of forming an insulating layer 51 in the groove GR formed by the etching; and a process of forming magnetic material to serve as the main pole 6A, on the insulating layer 51 in the groove GR.

By means of this etching, the metal layer 8 is divided in the region immediately below the mask, and the first and second near-field light-generating portions 8A, 8B are formed. Because the thickness of the insulating layer 51 formed by sputtering or similar can be controlled with high precision, the main pole 6A positioned in the groove GR and the first and second near-field light-generating portions 8A, 8B can be brought close together with extremely high precision, and moreover, through self-alignment using the groove GR formed by etching, these elements can be positioned precisely.

Next, an example is explained in which the groove GR extends from the upper cladding to the core interior.

Figure 12:
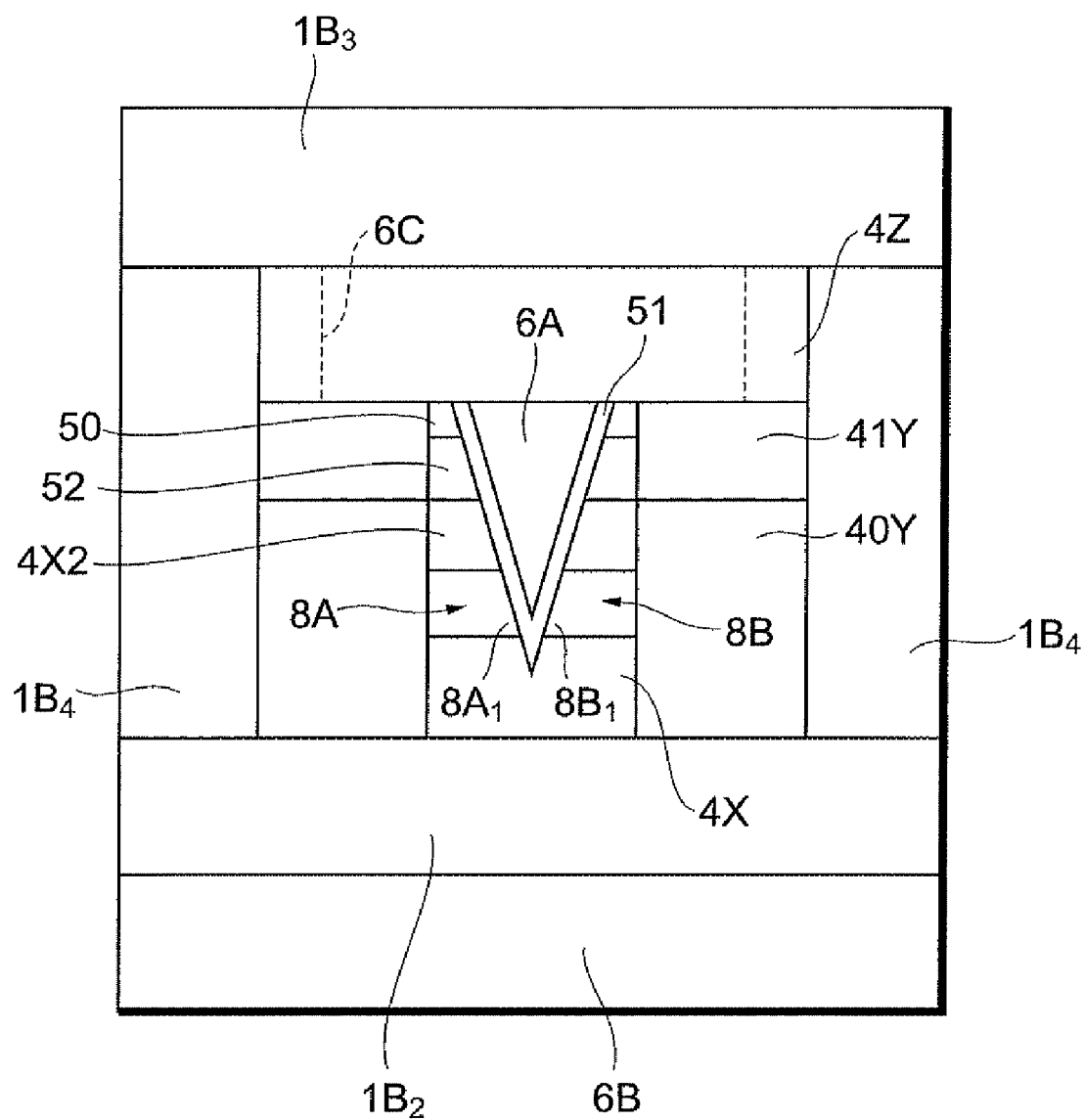
FIG. 12 is a plane view of the medium-opposing surface of a thermally assisted magnetic head in the vicinity of the main pole 6A.

FIG. 12 is a plane view of the medium-opposing surface of a thermally assisted magnetic head in the vicinity of the main pole 6A.

The core layer 4X is positioned above the insulating layer $1B_2$ serving as the lower cladding; on the core layer 4X are positioned near-field light-generating portions 8A and 8B, on this is positioned a core layer 4X2, and on the core layer 4X2 is positioned the insulating layer 52 serving as the upper cladding. A polish stop layer 50 is formed on the insulating layer 52.

A separate insulating layer 40Y serving as the core is positioned on both sides of the core layers 4X, 4X2 forming the core 4; on the insulating layer 40Y is positioned cladding 41Y. That is, the core 4 comprising the core layers 4X, 40Y, 4X2 is positioned within the cladding comprising the insulating layers 41Y, $1B_4$, $1B_2$; energy rays propagate in the core 4, and irradiate at least the opposing portions $8A_1$, $8B_1$ of the near-field light-generating portions 8A, 8B. The energy rays may also irradiate the entirety of the near-field light-generating portions 8A and 8B. The core material comprises $TaO_x$, and the cladding material comprises $Al_2O_3$.

Next, a method for manufacturing the thermally assisted magnetic head shown in FIG. 12 is explained.

FIG. 13A to FIG. 16 are perspective views of thermally assisted magnetic head intermediate members, used to explain the method for manufacturing a thermally assisted magnetic head. Other elements exist on the periphery of the element shown in the perspective views, but to clearly illustrate the characteristic portions, illustrations of these are omitted in the figures.

Figure 13A:
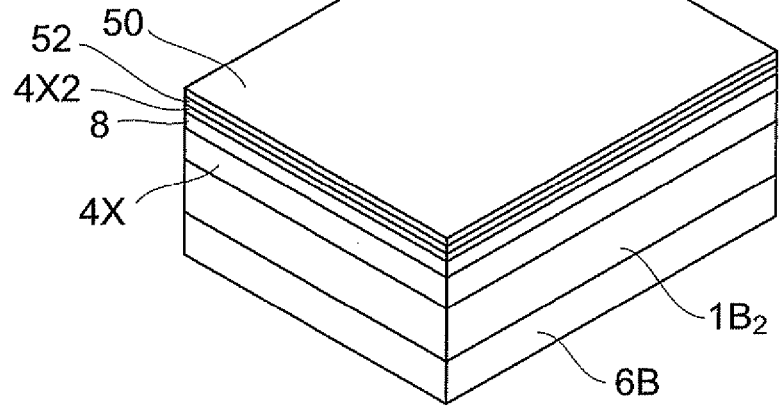
FIG. 13A is a perspective view of a thermally assisted magnetic head intermediate member, used to explain a method for manufacturing a thermally assisted magnetic head.
Figure 13B:
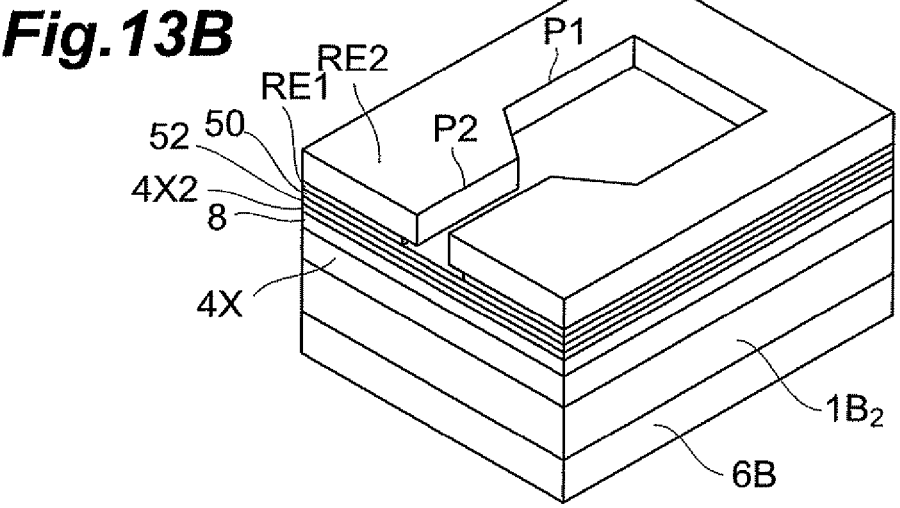
FIG. 13B is a perspective view of a thermally assisted magnetic head intermediate member, used to explain a method for manufacturing a thermally assisted magnetic head.

First, as shown in FIG. 13A, an insulating layer (cladding) $1B_2$ comprising low-refractivity material, a core layer 4X comprising low-refractivity material, a metal layer 8 for formation of near-field light-generating portions (to simplify the explanation, indicated by the same symbol used for the near-field light-generating portions 8), core layer 4X2, insulating layer 52 serving as cladding, and polish stop layer 50, are formed in order on the auxiliary pole (assisting magnetic pole) 6B. In this example, $TaO_x$ is used as the core layers 4X and 4X2, Au is used as the metal layer 8, and Ta is used as the polish stop layer 50. As the method of formation of these layers, a sputtering method can be used.

Next, as shown in FIG. 1 3B, two resist layers RE1 and RE2, with different solubilities with respect to the etching liquid, are deposited in order, the resist layers are exposed to the desired pattern, and development processing is performed, to form patterned resist layers RE1 and RE2 on the polish stop layer 50. The characteristics of these resist materials, and the pattern formed in the resist layers RE1 and RE2, are as described above.

Figure 13C:
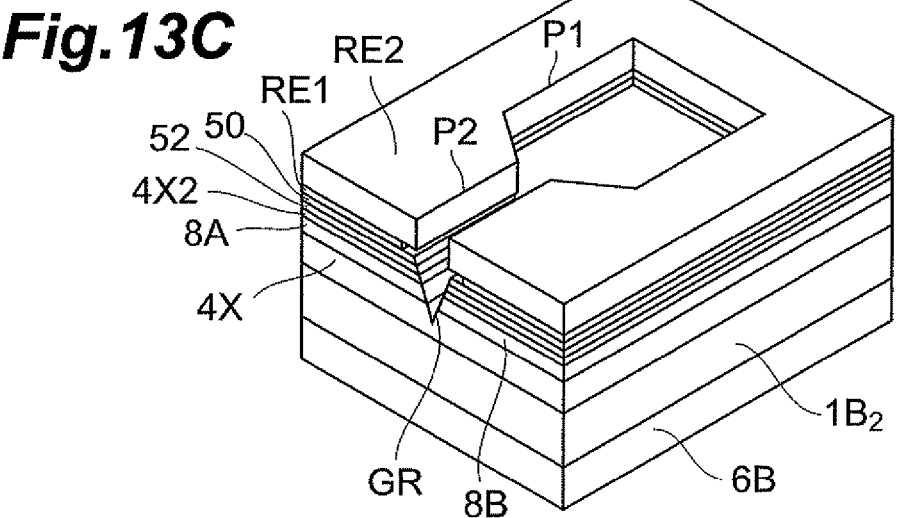
FIG. 13C is a perspective view of a thermally assisted magnetic head intermediate member, used to explain a method for manufacturing a thermally assisted magnetic head.

Next, as shown in FIG. 13C, reactive ion etching (RIE) of the polish stop layer 50, insulating layer 52, core layer 4X2, metal layer 8, and core layer 4X is performed, using the two resist layers RE1, RE2 as a mask. As the RIE etching gas material, $CF_4$ can be used. These layers are etched while tracking the pattern formed in the resist layers RE1 and RE2; the layers have a slit pattern P2 which is continuous with one end of the base portion pattern P1.

This etching advances until the core layer 4X is reached; a V-shaped groove GR is formed immediately below the slit pattern P2, and the deepest portion of the groove OR is positioned in the core layer 4X. Through formation of the groove GR, the center portion of the end face of the metal layer 8 is divided.

Next, the mask, comprising the resist layers RE1 and RE2, is removed using acetone or another organic solvent.

Figure 14A:
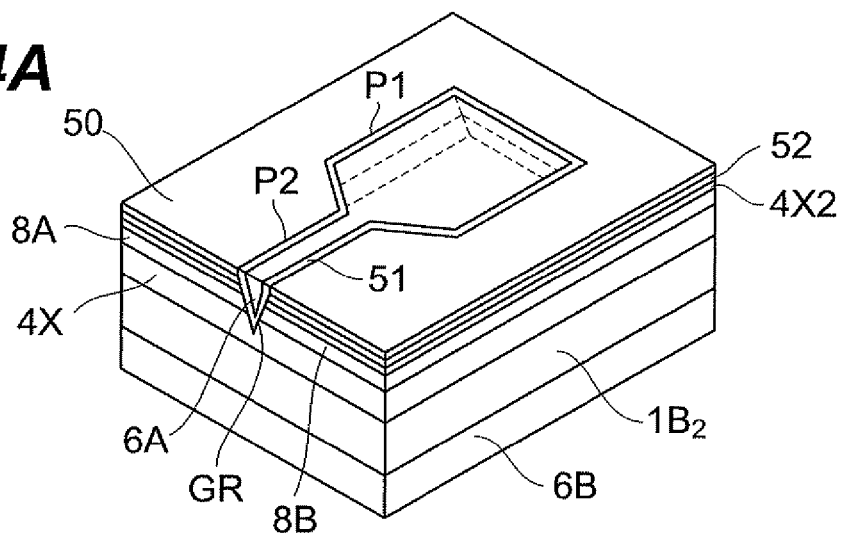
FIG. 14A is a perspective view of a thermally assisted magnetic head intermediate member, used to explain a method for manufacturing a thermally assisted magnetic head.

Next, as shown in FIG. 14A, a CVD method is used to deposit an insulating layer 51 on the inner faces of the groove GR and the polish stop layer 50; then, magnetic material forming a magnetic pole is deposited on the insulating layer 51, and chemical-mechanical polishing (CMP) is executed until the exposed surface reaches the polish stop layer 50. The polish stop layer 50 comprises a material of higher hardness than the magnetic material forming the magnetic pole or the insulating layer 51.

The insulating layer 51 remains in the base portion pattern P1 and in the slit pattern P2, and when magnetic material is formed on the insulating layer 51, a main pole 6A is formed in the groove GR immediately below the slit pattern P2.

Figure 14B:
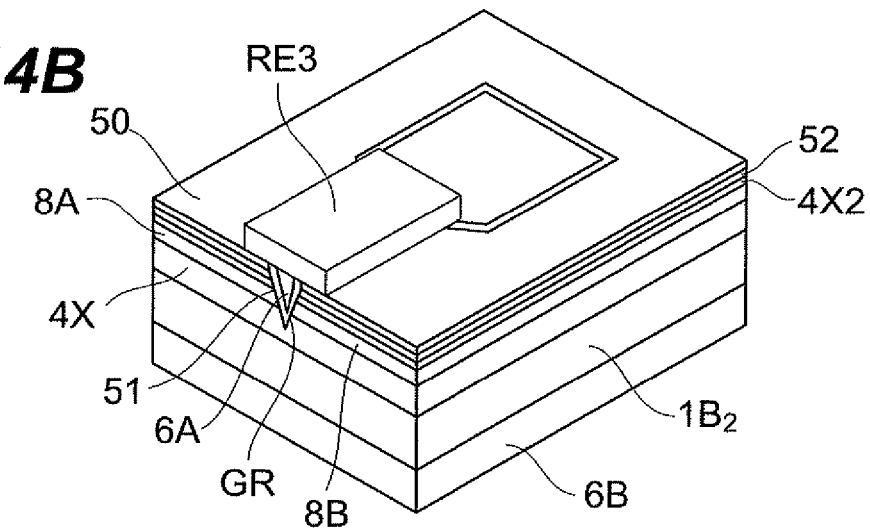
FIG. 14B is a perspective view of a thermally assisted magnetic head intermediate member, used to explain a method for manufacturing a thermally assisted magnetic head.

Next, as shown in FIG. 14B, after applying resist RE3 onto the polish stop layer 50 and main pole 6A, the resist RE3 is patterned, and is caused to remain on the polish stop layer 50 and main pole 6A such that the resist RE3 covers the slit pattern P2.

Figure 14C:
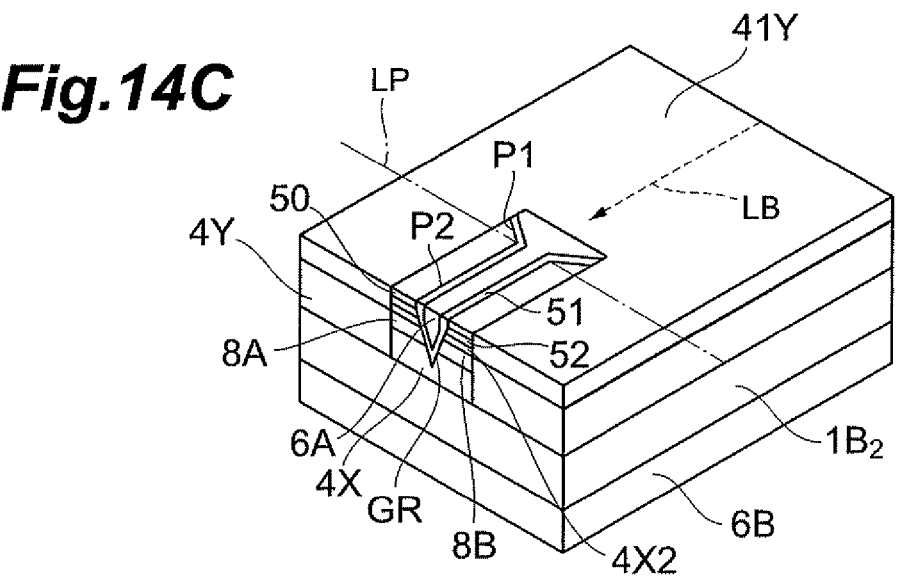
FIG. 14C is a perspective view of a thermally assisted magnetic head intermediate member, used to explain a method for manufacturing a thermally assisted magnetic head.

Next, as shown in FIG. 14C, the resist RE3 is used as a mask to perform etching, using milling by Ar sputtering or similar, of the surrounding polish stop layer 50, insulating layer 52 serving as cladding, core layer 4X2, metal layer 8, magnetic material, and core layer 4X, until the insulating layer $1B_2$ is reached, to expose the near-field light-generating portions 8A, 8B from the metal layer 8. Next, the core layer 40Y and insulating layer 41Y are deposited on the etched region, and then, an organic solvent is used to remove the resist RE3. In the completed device, as shown in FIG. 14C, energy rays LB pass through the core layers 4X, 4X2 and 40Y and propagate in the direction of the main pole 6A, but in the final manufacturing process described below, the element is polished up to a polishing line LP in the figures. The polishing line LP is set as described above.

Figure 15A:
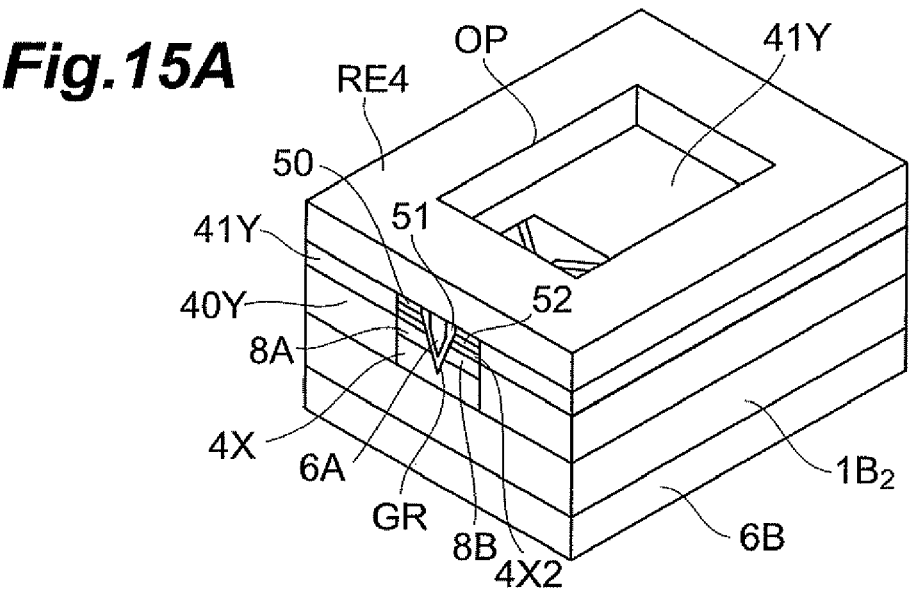
FIG. 15A is a perspective view of a thermally assisted magnetic head intermediate member, used to explain a method for manufacturing a thermally assisted magnetic head.
Figure 15B:
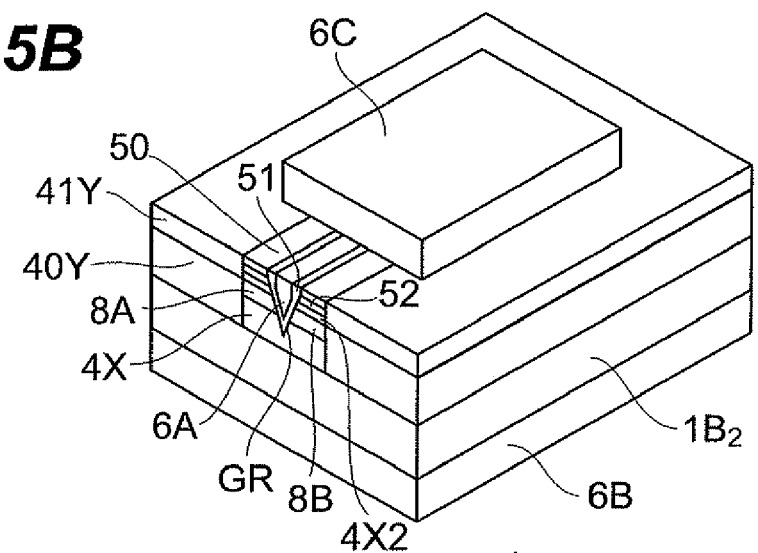
FIG. 15B is a perspective view of a thermally assisted magnetic head intermediate member, used to explain a method for manufacturing a thermally assisted magnetic head.

Next, as shown in FIG. 15A, resist RE4 is applied onto the substrate exposed surface, including the insulating layer 41Y serving as cladding and the polish stop layer 50; patterning of the resist RE4 is performed such that the slit pattern P2 is opened on the side of the base portion pattern P1, to form the opening OP. Next, as shown in FIG. 15B, the resist RE4 is used as a mask, magnetic material is deposited on top, and when the resist RE4 is removed, a magnetic material layer 6C serving as a magnetic yoke is formed in a state of partial physical contact with the main pole 6A.

Figure 15C:
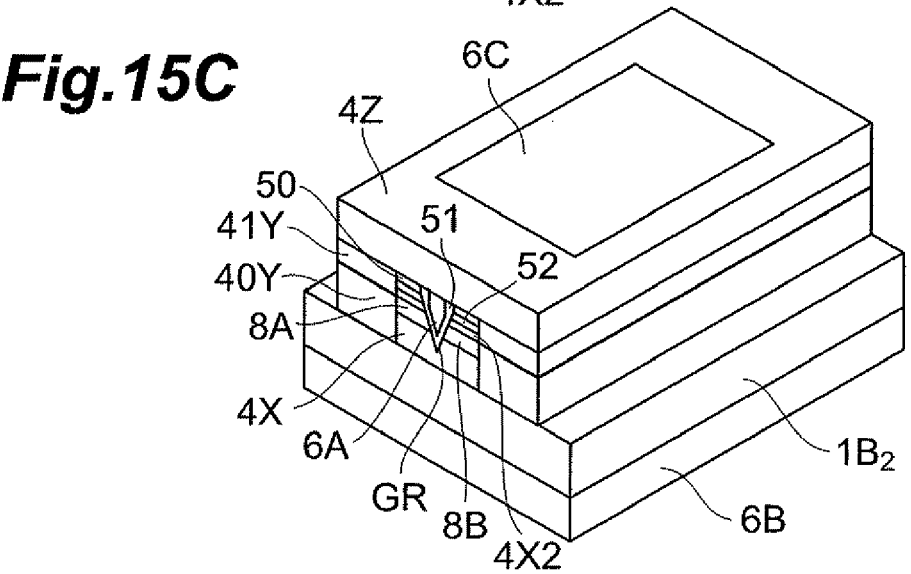
FIG. 15C is a perspective view of a thermally assisted magnetic head intermediate member, used to explain a method for manufacturing a thermally assisted magnetic head.

Next, as shown in FIG. 15C, the core layer 4Z is deposited by sputtering onto the exposed surface of the substrate including the magnetic material layer 6C and core layer 41Y, and chemical-mechanical polishing of the exposed surface of the core layer 4Z is performed until the magnetic material layer 6C is exposed. Thereafter, in order to form a waveguide, the core layer 4Z, insulating layer 41Y, and core layer 40Y in the region separated by a prescribed distance in the lateral direction from the light propagation path are etched until the insulating layer $1B_2$, serving as cladding, is reached. A resist pattern is formed in the region not etched. The above-described RIE can be used for this etching.

Thereafter, an insulating layer $1B_4$ serving as cladding is deposited on the periphery of the core 4 comprising the core layers 4Z, 4X2, 40Y, and chemical-mechanical polishing of the exposed surface is again performed until the magnetic material layer 6C is exposed. On the magnetic material layer 6C and insulating layer $1B_4$ which have thus been planarized, the upper magnetic material layer 6D is formed (see FIG. 16), and thereafter, an insulating layer $1B_3$ serving as cladding is deposited thereupon (see FIG. 4).

Figure 16:
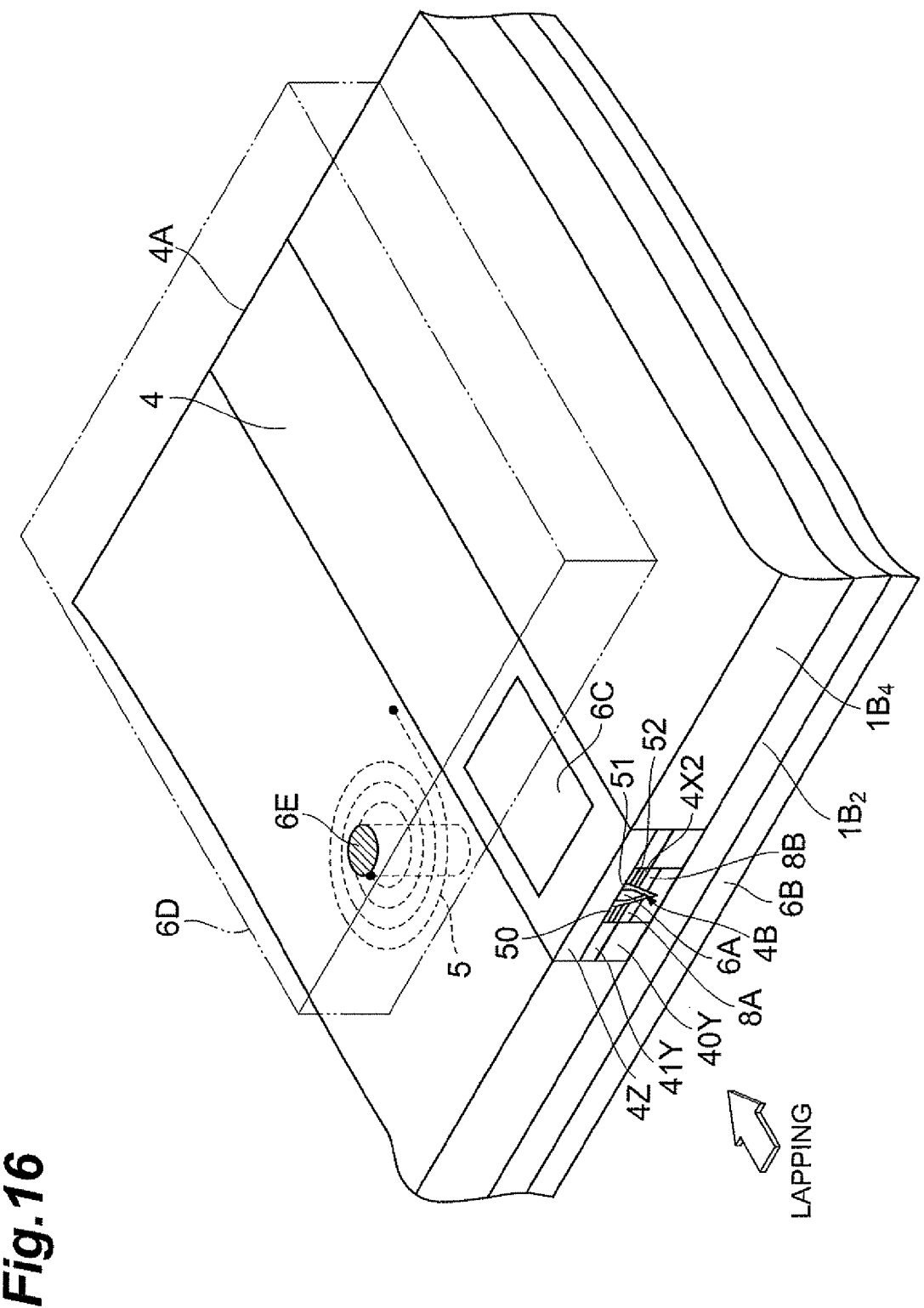
FIG. 16 is a perspective view of a thermally assisted magnetic head intermediate member, used to explain a method for manufacturing a thermally assisted magnetic head.

The method for manufacturing the penetrating magnetic material 6E shown in FIG. 16 is as described above. Each of the magnetic material layers can be formed by a plating method.

Finally, the medium-opposing surface is lapped (polished) in the direction of the arrow in FIG. 16, to form the magnetic head portion 1B shown in FIG. 3 on the slider substrate 1A. As shown in FIG. 3, when the light source unit 2 is affixed to the slider 1, the thermally assisted magnetic head is completed.

Figure 17:
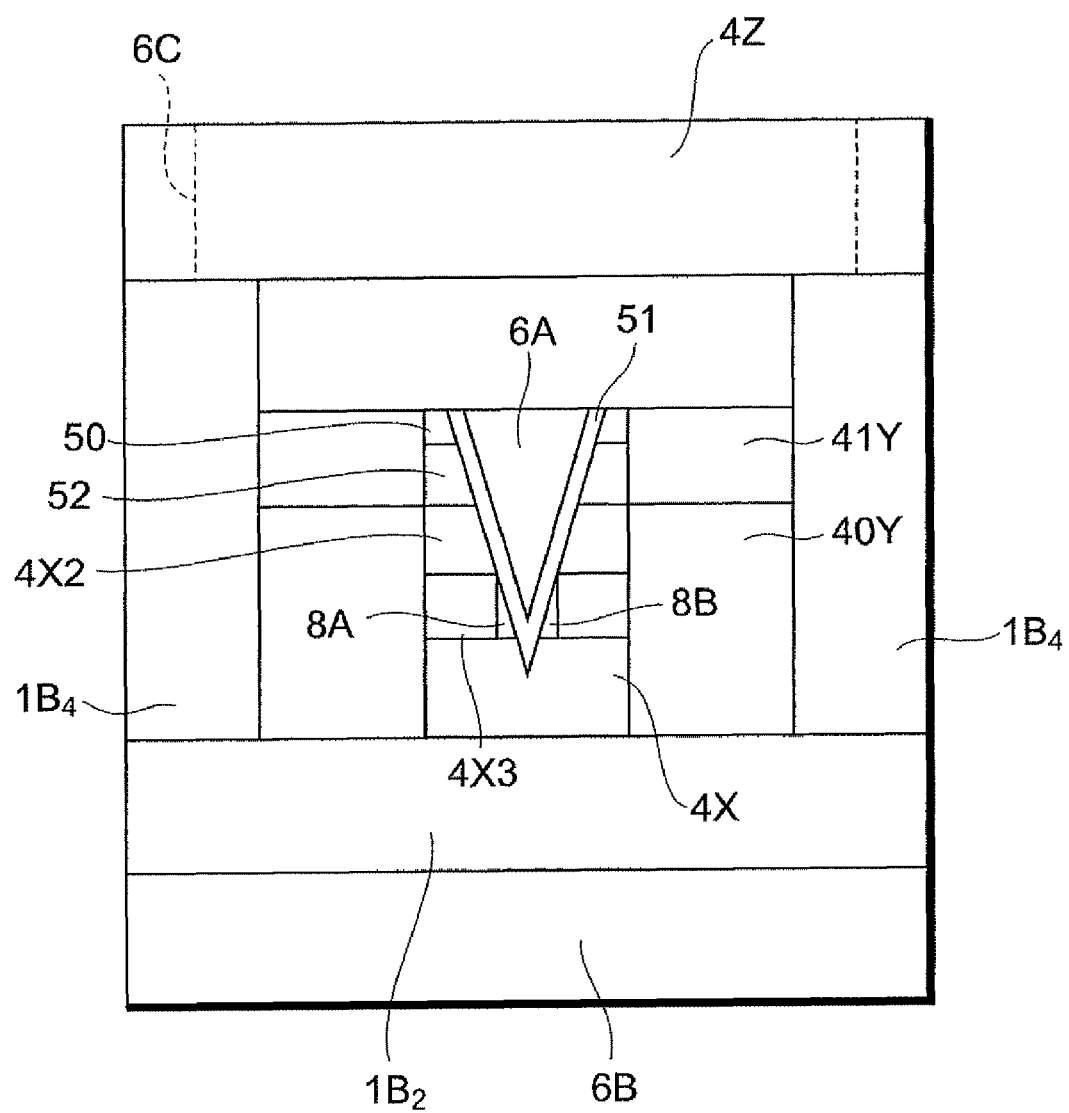
FIG. 17 is a plane view of the medium-opposing surface of the thermally assisted magnetic head of a modified example, in the vicinity of the main pole 6A.

FIG. 17 is a plane view of the medium-opposing surface of the thermally assisted magnetic head of a modified example in the vicinity of the main pole 6A.

The planar shape of the above-described near-field light-generating portions 8A and 8B is quadrilateral in shape; however, as shown in the figure, a triangular shape may be used. In this case, an appropriate core layer 4X3 can be inserted between the near-field light-generating portions 8A, 8B and the core layer 40Y. The above-described core 4 may comprise a plurality of dielectric layers with different refractivities.

What is claimed is:

1. A thermally assisted magnetic head, comprising:
   first and second near-field light-generating portions, positioned on a medium-opposing surface spaced apart from each other, each of the first and second near-field light-generating portions being comprised of a metal layer; and
   a main pole, at least a portion of which is positioned between the first and second near-field light-generating portions.

2. The thermally assisted magnetic head according to claim 1, further comprising, in a region between the first near-field light-generating portion and the second near-field light-generating portion, a light-emitting element which emits an energy ray.

3. The thermally assisted magnetic head according to claim 1, further comprising: a core, a tip face provided with the first and second near-field light-generating portions; and cladding provided on a periphery of the core, wherein the main pole is provided in a groove the deepest portion of which is positioned in the core, and the first and second near-field light-generating portions are respectively positioned adjacent to opposite side faces of the groove.

4. The thermally assisted magnetic head according to claim 1, further comprising an information writing coil which serves to pass magnetic flux through the main pole.

5. A method for manufacturing a thermally assisted magnetic head, comprising the steps of:
   forming a core on cladding;
   forming a metal layer on the core;
   forming a mask, having a slit pattern, on the metal layer;
   etching the metal layer and the core through the mask having the slit pattern to i) form a groove in the core, and ii) form, from the metal layer, first and second near-field light-generating portions spaced apart from each other;
   forming an insulating layer in the groove formed by the etching step; and
   forming magnetic material serving as a main pole, on the insulating layer in the groove, wherein the main pole is arranged between the first and second near-field light-generating portions.

* * * * *